US011490331B2

(12) United States Patent
Cariou et al.

(10) Patent No.: US 11,490,331 B2
(45) Date of Patent: Nov. 1, 2022

(54) METHODS AND APPARATUS TO FACILITATE TARGET WAKE TIME MANAGEMENT BETWEEN ACCESS POINTS AND DEVICES

(71) Applicant: Intel IP Corporation, Santa Clara, CA (US)

(72) Inventors: Laurent Cariou, Portland, OR (US); Yaron Alpert, Hod Hasharon (IL); Oren Kaidar, Binyamina (IL); Leor Rom, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 124 days.

(21) Appl. No.: 16/995,504

(22) Filed: Aug. 17, 2020

(65) Prior Publication Data
US 2021/0037464 A1    Feb. 4, 2021

Related U.S. Application Data

(63) Continuation of application No. 16/119,350, filed on Aug. 31, 2018, now Pat. No. 10,750,445.

(60) Provisional application No. 62/553,285, filed on Sep. 1, 2017, provisional application No. 62/553,660, filed on Sep. 1, 2017, provisional application No.
(Continued)

(51) Int. Cl.
H04W 52/02    (2009.01)

(52) U.S. Cl.
CPC ... H04W 52/0216 (2013.01); H04W 52/0219 (2013.01); H04W 52/0229 (2013.01)

(58) Field of Classification Search
CPC ........ H04W 52/0216; H04W 52/0229; H04W 52/0219
See application file for complete search history.

(56) References Cited

U.S. PATENT DOCUMENTS 10,750,445 B2    8/2020  Cariou et al.
2016/0219522 A1*  7/2016  Asterjadhi ........ H04W 28/0221
(Continued)

OTHER PUBLICATIONS

United States Patent and Trademark Office, "Non-Final Office Action", issued in connection with U.S. Appl. No. 16/119,350, dated Aug. 2, 2019, (10 pages).
(Continued)

Primary Examiner — Kevin M Cunningham
(74) Attorney, Agent, or Firm — Hanley, Flight & Zimmerman, LLC

(57) ABSTRACT

Methods, apparatus, systems and articles of manufacture are disclosed to facilitate target wake time management between access points and devices. An example station based apparatus to facilitate target wake time operations between an access point and the station includes a data manager to determine at least one of a quantity of uplink data to be sent by the station or a quantity of downlink data to be received by the station, a connection manager to schedule a connection of the station to a device different than the access point, and a target wake time negotiator in communication with a component interface to at least one of receive a signal from or distribute a signal to the access point, the signal to modify a service period of the target wake time based on at least one of the quantity of uplink data, the quantity of downlink data, or the scheduled connection.

20 Claims, 15 Drawing Sheets

Related U.S. Application Data

62/553,604, filed on Sep. 1, 2017, provisional application No. 62/553,301, filed on Sep. 1, 2017.

(56) References Cited

U.S. PATENT DOCUMENTS

| | | |
|---|---|---|
| 2016/0360443 A1 | 12/2016 | Hedayat |
| 2016/0374093 A1 | 12/2016 | Asterjadhi et al. |
| 2017/0265130 A1 | 9/2017 | Kakani |
| 2019/0045438 A1 | 2/2019 | Cariou et al. |
| 2019/0053155 A1* | 2/2019 | Kneckt ............ H04W 52/0216 |

OTHER PUBLICATIONS

United States Patent and Trademark Office, "Final Office Action", issued in connection with U.S. Appl. No. 16/119,350, dated Dec. 3, 2019, (9 pages).

United States Patent and Trademark Office, "Notice of Allowance", issued in connection with U.S. Appl. No. 16/119,350, dated Apr. 8, 2020, (9 pages).

\* cited by examiner

METHODS AND APPARATUS TO FACILITATE TARGET WAKE TIME MANAGEMENT BETWEEN ACCESS POINTS AND DEVICES

RELATED APPLICATIONS

This patent arises from a continuation of U.S. patent application Ser. No. 16/119,350, (Now U.S. Pat. No. 10,750, 445) which was filed on Aug. 31, 2018, which claims the benefit of U.S. Provisional Patent Application Ser. No. 62/553,285, filed Sep. 1, 2017; U.S. Provisional Patent Application Ser. No. 62/553,301, filed Sep. 1, 2017; U.S. Provisional Patent Application Ser. No. 62/553,604, filed Sep. 1, 2017; and U.S. Provisional Patent Application Ser. No. 62/553,660, filed Sep. 1, 2017. U.S. patent application Ser. No. 16/119,350; U.S. Provisional Patent Application Ser. No. 62/553,285; U.S. Provisional Patent Application Ser. No. 62/553,301; U.S. Provisional Patent Application Ser. No. 62/553,604; and U.S. Provisional Patent Application Ser. No. 62/553,660 are hereby incorporated by reference in their entireties. Priority to U.S. patent application Ser. No. 16/119,350; U.S. Provisional Patent Application Ser. No. 62/553,285; U.S. Provisional Patent Application Ser. No. 62/553,301; U.S. Provisional Patent Application Ser. No. 62/553,604; and U.S. Provisional Patent Application Ser. No. 62/553,660 is hereby claimed.

FIELD OF THE DISCLOSURE

This disclosure relates generally to communication between access points, and, more particularly, to methods and apparatus to facilitate target wake time management between access points and devices.

BACKGROUND

Many locations provide Wi-Fi connectivity to connect Wi-Fi enabled devices to networks such as the Internet. Wi-Fi enabled devices include personal computers, video-game consoles, mobile phones and devices, tablets, smart televisions, digital audio player, etc. Wi-Fi allows Wi-Fi enabled devices to wirelessly access the Internet via a wireless local area network (WLAN). To provide Wi-Fi connectivity to a device, a Wi-Fi access point transmits a radio frequency Wi-Fi signal to the Wi-Fi enabled device within the signal range of the access point (e.g., a hot spot, a modem, etc.). A Wi-Fi access point periodically sends out a beacon frame which contains information that allows Wi-Fi enabled devices to identify, connect to, and transfer data to the access point.

Wi-Fi is implemented using a set of media access control (MAC) and physical layer (PHY) specifications (e.g., the Institute of Electrical and Electronics Engineers (IEEE) 802.11 protocol). Devices (e.g., access points and Wi-Fi enabled devices) able to operate using IEEE 802.11 protocol are referred to as stations (STA).

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
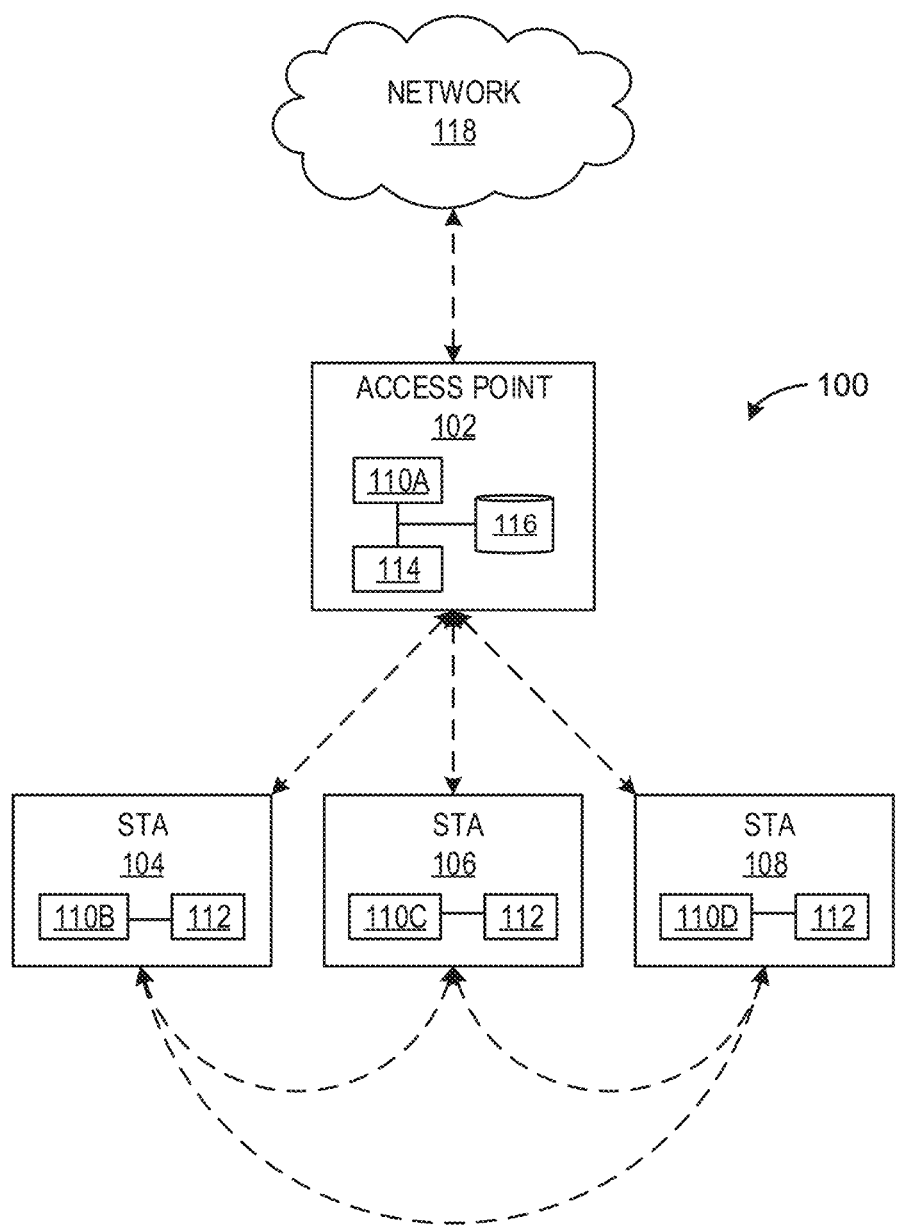
FIG. 1 is an illustration of communications using wireless local area network (WLAN) Wi-Fi protocols to facilitate wireless connectivity including target wake time management between access points and devices.

Various locations (e.g., homes, offices, coffee shops, restaurants, parks, airports, etc.) may provide Wi-Fi to the Wi-Fi enabled devices (e.g., STAs) to connect the Wi-Fi enabled devices to the Internet, or any other network, with minimal hassle. The locations may provide one or more Wi-Fi access points (APs) to output Wi-Fi signals to the Wi-Fi enabled devices within a range of the Wi-Fi signals (e.g., a hotspot). A Wi-Fi AP is structured to wirelessly connect a Wi-Fi enabled device to the Internet through a wireless local area network (WLAN) using Wi-Fi protocols (e.g., such as IEEE 802.11). The Wi-Fi protocol is the protocol for how the AP communicates with the devices to provide access to the Internet by transmitting uplink (UL) transmissions and receiving downlink (DL) transmissions to/from the Internet. Wi-Fi protocols describe a variety of management frames (e.g., beacon frames and trigger frames) that facilitate the communication between access points and stations.

IEEE 802.11 standards intend to define multi user (MU) operations and also improve power save mechanisms for STAs. In order to support the new UL and DL MU operation in addition to providing a scheduled power save mode, modifications to the existing IEEE 802.11 operation, in particular Target Wake Time (TWT) operations are needed. In IEEE 802.11, TWT is the main power save mechanism for 11ax devices. More specifically, TWT allows a STA to negotiate a target wake time period with the AP, called TWT service period (SP), where the STA is expected to be awake. There are many flavors of TWT, individual or broadcast, announced or unannounced.

In some examples of the announced version of TWT, according to the IEEE 802.11 standards, the STA is allowed to skip one or more TWT SPs if the STA does not have anything to send or if the STA notes in the beacon Traffic Indication Map (TIM) that the AP does not have anything to send to it.

Similar to most power save mechanisms defined in IEEE802.11, the current TWT mechanism only takes into account DL traffic. As such, the TWT SP starts with an indication that the STA is awake (e.g., via a PS-poll, a UAPSD trigger, etc.) and ends when the AP no longer has buffered data to send to the STA. As such, a gap exists in the IEEE802.11 standard in that it does not support simultaneous (UL/DL) announced TWT operation. Such TWT operation would, in some examples, enable the STA to indicate to the AP that it is awake to receive DL traffic in addition to indicating when the STA has traffic to send in UL.

As such, one example embodiment relates to simultaneous uplink and downlink with announced TWT. For example, a simultaneous uplink and downlink with announced TWT system can be associated with the announced TWT SP operation, both for broadcast and individual TWT. The simultaneous uplink and downlink with announced TWT system may address the gaps in IEEE802.11 by enhancing TWT mechanisms in order to take into account simultaneous MU service (both DL and UL traffic).

Further, a simultaneous uplink and downlink with announced TWT system can add signaling that supports simultaneous (UL/DL) announced TWT SP. The simultaneous uplink and downlink with announced TWT system can modify announced TWT such that the STA can indicate its UL buffer status report at the time that it indicates that it is awake and desires to participate in the announced TWT. If the TWT is not trigger-based, then the STA can send a power save poll (PS-Poll) together with a quality of service (QoS) null frame carrying a QoS control including the queue size of its UL buffer. If the TWT is trigger-based, then the AP shall trigger the STA in a way that allows the STA to report both the fact that it is in the awake state and whether it has traffic to send in UL or not.

In one embodiment, a simultaneous uplink and downlink with announced TWT system can modify announced TWT so that the AP, that receives an indication from a STA that it is awake and that it has traffic to send in UL, shall not terminate the TWT SP until the combination of A) the AP no longer has buffered data for the STA in DL or has sent a frame with end of service period (EOSP) bit set to 1 and B) the STA no longer has buffered data for the AP in UL (buffer status report (BSR) report equal to 0) or sent a frame with EOSP bit set to 1. Alternatively, the condition to terminate could also include at least one of the AP and/or STA setting the EOSP bit to 1.

In other examples of TWT, according to the IEEE 802.11 standards, the STA needs to be awake for the entire TWT SP, and there is no protocol that enables the STA to trigger an early and/or late (e.g., the TWT SP exceeds the originally agreed upon time) TWT SP termination event. Additionally, there is an ambiguity when the actual TWT SP ends.

As such, other example embodiments relate to early and/or late termination of the TWT SP as determined by the STA. In such examples of early termination, the STA modifies TWT SP termination by adding a new signal that enables the non-AP STA to terminate a TWT SP by triggering a termination event. Further, this can be triggered by sending a frame with the EOSP bit set to 1, or by sending any indication/signaling that is an explicit indication that the STA is moving to doze state. Further in such examples, the AP can receive the signaling and determine a state of the STA based upon the aforementioned signaling.

In such examples of late termination, a TWT negotiation system can facilitate that during the TWT negotiation, multiple modes of operation can be agreed on between the STA and the AP. For example, a first mode of operation can include instructions that the TWT SP shall not exceed the time set by the TWT start time and duration when one of the STA and/or the AP has connections with other devices (e.g., Wi-Fi connections, Bluetooth® connections, LTE connections, etc.) scheduled. Thus, termination events that would lead to an extension of the TWT SP are no longer valid and/or these termination events are only valid during the TWT SP boundaries. The indication may be added in the TWT element exchange during the negotiation, of which the STA has constraints for not exceeding the TWT SP boundaries (the AP or the STA or both the AP and the STA). Further, a second mode of operation can include instructions that the TWT SP can exceed the time set by the TWT start time and duration. In such examples, AP control to terminate the TWT SP is preserved. If the first mode of operation is put in place after negotiation between the AP and the STA, the devices (e.g., the AP and the STA) may rigidly abide by the TWT SP boundaries. In some examples, for a specific TWT SP, the STA or the AP may be able to temporarily exceed the TWT SP boundary.

For example, a TWT negotiation system may define a way for the AP and the STA to agree to exceed the TWT SP boundaries for a particular TWT SP, only during the particular TWT SP. The initiator (e.g., at least one of the AP or the STA) may request to extend the TWT SP, and if the responder agrees with the request, the TWT SP boundaries for the particular TWT SP may be crossed. This signaling may be simplified if only one side of the link (e.g., the STA) has constraints not to cross the TWT SP boundaries. For example, a request and a response with full agreement from both sides (e.g., the AP and the STA) may not be needed. Instead, the signaling from the constrained device (e.g., the STA) is sufficient to allow both devices (e.g., the AP and the STA) to exceed the TWT SP boundaries.

In other examples of TWT, according to the IEEE 802.11 standards, a STA that negotiated a trigger-based (TB) TWT with its serving AP and is operating following this TB TWT can, in some examples, send a frame with the multi user (MU) disabled bit set to 1 to indicate that it no longer accepts triggering by the AP. Currently, the TB TWT is still in place, which means that the AP is supposed to send a trigger to the STA, but the STA will not respond to the trigger.

As such, other example embodiments relate to modification, suspension, and/or termination of the TWT SP agreement as negotiated between the STA and the AP. In some examples, the trigger-based TWT agreement is automatically transformed into a non-trigger-based TWT agreement. Thus, the negotiation for a new TWT session does not need to be completed, and the timing of the TWT SP as well as other parameters (e.g., announced/unannounced, etc.)

remain the same as agreed previously except for the trigger-based parameter. In other examples, the trigger-based TWT agreement is suspended when the MU disable bit is set to 1. In yet other examples, the trigger-based TWT agreement is automatically terminated (e.g., torn down) when the MU disable bit is set to 1.

Moving to the illustrations, FIG. 1 illustrates an example communication system 100 using wireless local area network Wi-Fi protocols to facilitate wireless connectivity between an example access point (AP) 102 and example STAs 104, 106, 108. The example of FIG. 1 includes the example AP 102, the example STAs 104, 106, 108, and an example network 118. The example STAs 104, 106, 108 include the example radio architecture 110B,C,D and the example STA based target wake time controller 112. The example AP 102 includes an example radio architecture 110A and an example AP based target wake time controller 114. Additionally, in some examples of the AP 102 and the STAs 104, 106, 108, the example radio architectures 110A, B,C,D may be physically similar but can, in some examples, operate on different (e.g., separate) transmission and/or reception frequencies.

The example AP 102 of FIG. 1 is a device that allows the example STAs 104, 106, 108 to access wirelessly the example network 118. The example AP 102 may be a router, a modem-router, and/or any other device that provides a wireless connection from the STAs 104, 106, 108 to the network 118. For example, if the AP 102 is a router, the router accesses the network 118 through a wire connection via a modem. If the AP 102 is implemented utilizing a modem-router, such a device combines the functionalities of the modem and the router. In some examples, the AP 102 is a STA that is communication with the STAs 104, 106, 108.

The example radio architecture 110A of the AP 102 corresponds to components used to wirelessly transmit and/or receive data, as further described below in conjunction with the examples shown in FIG. 11. Additionally, the example AP 102 may include an application processor (e.g., the example application processor 1110 of FIG. 11) to generate instructions related to other Wi-Fi protocols.

The example STAs 104, 106, 108 of FIG. 1 are Wi-Fi enabled devices that attempt operation with the AP 102 during a target wake time (TWT) service period (SP). The example STAs 104, 106, 108 may be, for example, a computing device, a portable device, a mobile device, a mobile telephone, a smart phone, a tablet, a gaming system, a digital camera, a digital video recorder, a television, a set top box, an e-book reader, and/or any other Wi-Fi enabled device.

The example STAs 104, 106, 108 include the example STA based target wake time controller 112 to facilitate target wake time (TWT) service period (SP) agreements and/or modifications with the AP 102. Additionally, the STA based target wake time controller 112 is further described in conjunction with FIG. 2.

The example AP 102 includes the example AP based target wake time controller 114 to facilitate TWT SP agreements and/or modifications with one or more of the STAs 104, 106, 108. Additionally, the AP based target wake time controller 114, further described in conjunction with FIG. 3, can, after receiving instructions from the application processor 1110 of FIG. 11 to transmit data, generate a data packet containing the requested data and TWT rules and/or agreements. Once the data packet has been generated and segmented, the AP based target wake time controller 114 transmits the segmented data packet to the example radio architecture 110A to be wirelessly transmitted to the requesting STA (e.g., the example STAs 104, 106, 108). The example radio architecture 110A is described in further detail below in conjunction with FIG. 11.

The example parameter storer 116 of the example AP 102 of the example communication system 100 of FIG. 1 is in communication with at least the radio architecture 110A and the AP based target wake time controller 114 and is capable of storing one or more parameters and/or characteristics associated with the AP 102. In some examples, the parameter storer 116 can store at least identification information associated with one or more of the STAs 104, 106, 108 and/or TWT rules and/or agreements between the AP 102 and one or more of the STAs 104, 106, 108, among others.

Further, the parameter storer 116 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The parameter storer 116 may additionally or alternatively be implemented by one or more double data rate (DDR) memories, such as DDR, DDR2, DDR3, mobile DDR (mDDR), etc. The parameter storer 116 may additionally or alternatively be implemented by one or more mass storage devices such as hard disk drive(s), compact disk drive(s), digital versatile disk drive(s), etc. While in the illustrated example the parameter storer 116 is illustrated as a single database, the parameter storer 116 may be implemented by any number and/or type(s) of databases. Further, the parameter storer 116 be located in the AP 102 or at a central location outside of the AP 102. Furthermore, the data stored in the parameter storer 116 may be in any data format such as, for example, binary data, comma delimited data, tab delimited data, structured query language (SQL) structures, etc.

The example network 118 of FIG. 1 is a system of interconnected systems exchanging data. The example network 118 may be implemented using any type of public or private network such as, but not limited to, the Internet, a telephone network, a local area network (LAN), a cable network, and/or a wireless network. To enable communication via the network 118, the example AP 102 includes a communication interface that enables a connection to an Ethernet, a digital subscriber line (DSL), a telephone line, a coaxial cable, or any wireless connection, etc. In some examples, the example network 118 provides the requested data to be organized into data packets.

Figure 2:
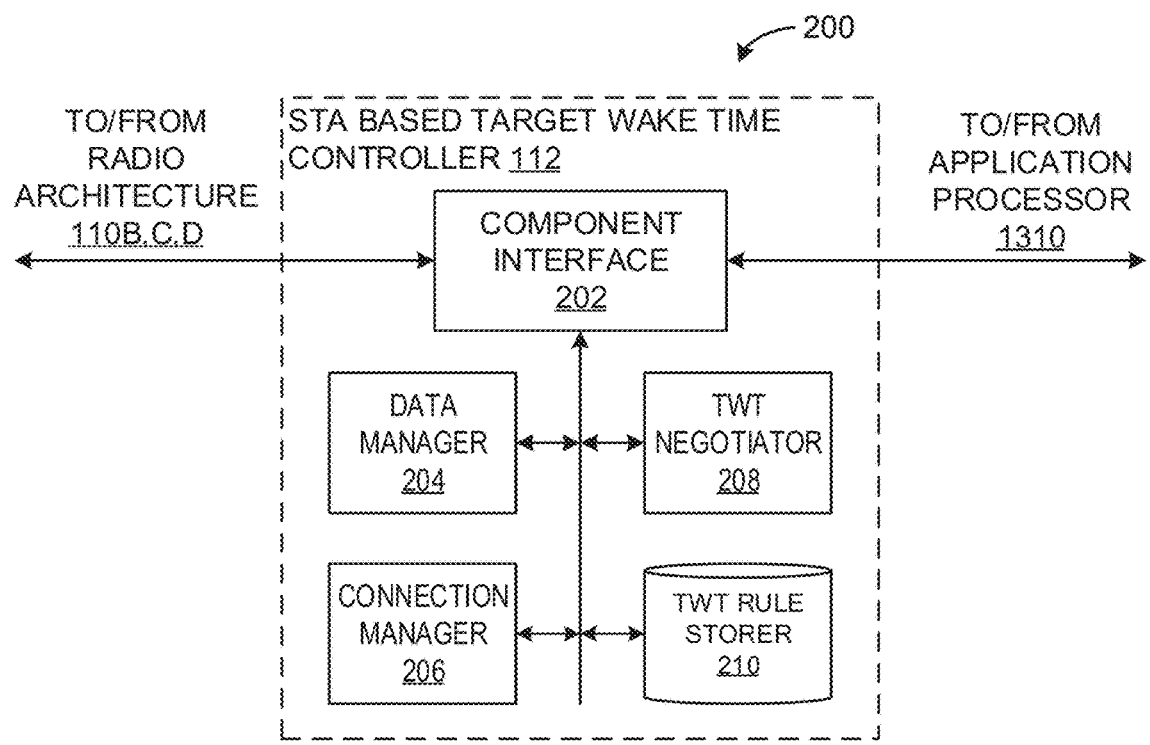
FIG. 2 is a block diagram of an example station based target wake time controller of FIG. 1.

FIG. 2 is a block diagram of an example implementation 200 of the STA based target wake time controller 112 of FIG. 1, disclosed herein, to facilitate negotiation and/or modification of a TWT SP between the AP 102 and one or more of the STAs 104, 106, 108. The example STA based target wake time controller 112 includes an example component interface 202, an example data manager 204, an example connection manager 206, an example target wake time (TWT) negotiator 208, and an example target wake time (TWT) rule storer 210. While in the illustrated example, each of the STAs 104, 106, 108 includes the STA based target wake time controller 112, one or more of the STAs 104, 106, 108 may not include or otherwise implement the STA based target wake time controller 112 or one or more components included in the STA based target wake time controller 112.

The example component interface 202 of FIG. 2 interfaces with the application processor 1110 to transmit signals (e.g., instructions to operate according to a protocol) and/or receive signals (e.g., instructions corresponding to which ACK type to use) from the example application processor 1110. Additionally, the example component interface 202 interfaces with the example radio architecture(s) 110B,C,D to instruct the radio architecture(s) 110B,C,D to transmit data packet/frames to and/or to receive data packets from the radio architecture 110A.

The example data manager 204, included in or otherwise implemented by the STA based target wake time controller 112 of FIG. 2, can manage at least one of a queue associated with data included in an uplink (UL) buffer (e.g., data to be sent from one of the STAs 104, 106, 108 to the AP 102) and/or a queue associated with data included in a downlink (DL) buffer (e.g., data to be sent from the AP 102 to one of the STAs 104, 106, 108).

In some examples, the data manager 204 can additionally or alternatively generate one or more reports including a quantity of data (e.g., 400 kB, 6 MB, 1.3 GB, etc.) queued in at least one of the UL buffer and/or the DL buffer. In such examples, the report(s) generated by the data manger 204 can additionally or alternatively include a binary data bit denoting whether one of the UL buffer or the DL buffer includes a non-zero quantity of data (e.g., the bit set to 1 when the respective buffer includes a non-zero quantity of data and the bit set to 0 when the respective buffer includes no data, etc.). Additionally, the data manger 204 can distribute the one or more generated report(s) to at least one of the component interface 202, the TWT negotiator 208, and/or the TWT rule storer 210.

The example connection manager 206, included in or otherwise implemented by the STA based target wake time controller 112 of FIG. 2, can determine whether other connections (e.g., Wi-Fi connections, Bluetooth® connections, LTE connections, etc.) are scheduled for the respective one of the STAs 104, 106, 108 and a device other than the AP 102 (e.g., a peer to peer connection with another station, a connection with an access point different than the AP 102, etc.).

In some examples, the connection manager 206 can generate a report including a listing of connections scheduled for the respective one of the STAs 104, 106, 108, the report including at least one of an identify of the other connecting device (e.g., the device is a second access point, a cellular device, a server, etc.), a scheduled time of the other connection (e.g., including at least one of a scheduled start time, end time, and/or duration of connection), and/or a connection type of the other connection (e.g., Wi-Fi connections, Bluetooth® connections, LTE connections, etc.). Additionally, the data manger 204 can distribute the one or more generated report(s) to at least one of the component interface 202, the TWT negotiator 208, and/or the TWT rule storer 210.

The example TWT negotiator 208, included in or otherwise implemented by the STA based target wake time controller 112 of FIG. 2, is capable of negotiating and/or modifying one or more parameters of a target wake time (TWT) agreement between the corresponding one of the STAs 104, 106, 108 and the AP 102.

In some examples, the TWT negotiator 208 can determine a wakefulness state of the respective one of the STAs 104, 106, 108 as retrieved from the TWT rule storer 210. In such examples, the TWT negotiator 208 is further to set an end of service period (EOSP) bit to 0 if the respective one of the STAs 104, 106, 108 is awake (e.g., active) and set the EOSP bit to 1 if the respective one of the STAs 104, 106, 108 is dozing (e.g., sleeping, inactive, etc.). Further in such examples, the TWT negotiator 208 determines a target wake time (TWT) mode of the connection between the respective one of the STAs 104, 106, 108 and the example AP 102 as retrieved from the TWT rule storer 210. In such examples, the TWT mode can include at least one of trigger based communication or non-trigger based communication.

In such examples, in response to determining the TWT mode includes non-trigger based communication, the TWT negotiator 208 can transmit the UL buffer status report indicating a queue size of the UL buffer to the AP 102 via the component interface 202 and at least one of the radio architecture(s) 110A,B,C,D via a power save poll (e.g., a PS-Poll) including a Quality of Service (QoS) null frame indicating the queue size. Additionally or alternatively, in response to determining the TWT mode includes trigger based communication, the TWT negotiator 208 can transmit each of the EOSP bit and the UL buffer status report to the AP 102 via the component interface 202 and at least one of the radio architecture(s) 110A,B,C,D In other examples, the TWT negotiator 208 can query at least one of the data manager 204 or the connection manager 206 to determine whether the respective one of the STAs 104, 106, 108 is ready to terminate the TWT SP. In such examples, the TWT negotiator 208 can determine the TWT SP can be terminated in response to the query of the data manger 204 returning an indication that there is no data queued in the UL buffer. Additionally or alternatively, the TWT negotiator 208 can determine the TWT SP can be terminated in response to the query of the connection manager 206 indicating a scheduled connection between the respective one of the STAs 104, 106, 108 and a device other than the AP 102. In either case, the TWT negotiator 208 can set an end of service period (EOSP) bit to 0 (e.g., terminate the TWT SP) and distribute a frame including the EOSP bit to the AP 102 via the component interface 202 and at least one of the radio architecture(s) 110A,B,C,D. In other examples, an EOSP bit set to 1 can denote the TWT SP is to be terminated.

In other such examples, the TWT negotiator 208 determines the respective one of the STAs 104, 106, 108 is not ready to terminate the TWT SP. Further in such examples, the TWT negotiator 208 sets an end of service period (EOSP) bit to 1 (e.g., maintain the TWT SP) and distributes a frame including the EOSP bit to the AP 102 via the component interface 202 and at least one of the radio architecture(s) 110A,B,C,D. In other examples, an EOSP bit set to 0 can denote the TWT SP is to be maintained.

In other examples, the TWT negotiator 208 can query the connection manager 206 to determine whether other connections (e.g., Wi-Fi connections, Bluetooth® connections, LTE connections, etc.) are scheduled for the respective one of the STAs 104, 106, 108 and a device other than the AP 102 (e.g., a peer to peer connection with another station, a connection with an access point different than the AP 102, etc.). In such examples, in response to determining other connections are scheduled, the TWT negotiator 208 can initialize a first mode for the respective one of the STAs 104, 106, 108, the first mode including instructions to not allow for an extension of the TWT service period (e.g., in order to facilitate the scheduled connections of the respective one of the STAs 104, 106, 108 and a device other than the AP 102).

For example, the TWT negotiator 208 may modify the TWT setup negotiation by defining a new field (e.g., one bit) in the TWT element that can be named (e.g., strict respect of the TWT SP boundaries) and set to 1 to disallow extension of the TWT SP beyond the TWT SP boundaries. For example, the new field can be in the control field, where there are currently four reserved bits. In some examples, the TWT negotiator 208 can define a bit in the high efficiency (HE) operation element or in the HE capabilities element from the HE non-AP STA(s) and/or from the HE AP STA(s)

that operates with the same function (e.g., to indicate whether the communication link is to proceed with strict respect of the TWT SP boundaries). During negotiation of the TWT SP, when the bit in the HE operation element or the HE capabilities element is set to 1, both the AP(s) and the STA(s) may agree that the TWT SP cannot exceed the TWT SP boundaries (e.g., the STA(s) may be in a doze state).

Additionally or alternatively, in response to determining no other connections are scheduled, the TWT negotiator 208 initializes a second mode for the respective one of the STAs 104, 106, 108, the second mode including instructions to allow for an extension of the TWT service period (e.g., due to a lack of constraints related to other scheduled connections of the respective one of the STAs 104, 106, 108 and in order to facilitate additional data transfer between the respective one of the STAs 104, 106, 108 and the AP 102). For example, the TWT negotiator 208 may set the new field in the TWT element to 0 to allow extension of the TWT SP beyond the TWT SP boundaries. In additional or alternative examples, when the bit in the HE operation element or the HE capabilities element is set to 0, restrictions on exceeding the TWT SP boundaries may not present.

In some examples, the TWT negotiator 208 facilitates new signaling for a temporary extension of an individual TWT SP. For example, the TWT negotiator 208 can temporally extend the TWT SP boundaries of an individual TWT SP in the first mode (e.g., when the AP(s) and the STA(s) negotiated TWT SPs so that the TWT SP boundaries cannot be exceeded). For example, to facilitate temporary TWT SP extension, the TWT negotiator 208 includes a single bit in a frame transmitted during the TWT SP. In such an example, the TWT negotiator 208 may use (1) one reserved bit in the operation mode indication (OMI) A-control field or (2) one reserved bit in any other A-control field types. If the A-control field carrying this bit is sent during the TWT SP and the bit is set to 1, then, for the current TWT SP only, the STA(s) that sent this bit allows the TWT SP boundaries of the TWT AP to be exceeded. Utilizing the OMI A-control field type is beneficial if a response and/or a confirmation is/are desired from the other side of the communication link because the OMI A-control field is a type of A-control field that requires acknowledgement from the other side of the communication link.

In some examples, if the TWT negotiator 208 is to include information about how long the TWT SP boundaries can be extended, the TWT negotiator 208 may implement additional signaling. For example, for a newly defined A-control field type (e.g., for TWT SP extension), the TWT negotiator 208 can indicate the duration to be added to the TWT SP as an extension. In additional or alternative examples, the TWT negotiator 208 may utilize specific frames instead of or in addition to using A-control fields. For example, the TWT negotiator 208 may define a new TWT extension frame. Additionally or alternatively, the TWT negotiator 208 may reuse the TWT information frame. As there are no available reserved bits in the TWT information element, the TWT negotiator 208 may include a new complementary element to the TWT information frame. This complementary element may include the indication that the associated TWT information frame is for extending the ongoing TWT SP. When the complementary element is present, the TWT information element is repurposed to carry information related to the extension. For example, the next TWT field may be reused to carry the duration of the extension.

In yet other examples, the TWT negotiator 208 can determine the AP 102 and one of the STAs 104, 106, 108 are operating in a trigger based (TB) target wake time (TWT) mode based on an in-place target wake time (TWT) agreement between the AP 102 and one of the STAs 104, 106, 108. In such examples, this facilitates the enablement of multi user (MU) operation of the AP 102. Further, the TWT negotiator 208 can set the MU bit to 1, thereby disabling MU and TB operation, and transmits the bit in a frame to the AP 102 via the component interface 202 and at least one of the radio architecture(s) 110A,B,C,D.

In such examples, in response to setting the MU bit to 1, the TWT negotiator 208 can, in tandem with the TWT negotiator 304, negotiate at least one of a modified, replacement, and/or suspended TWT agreement. For example, the TWT negotiator 208 can negotiate a modified TWT agreement, the modified TWT agreement including non-trigger based (non-TB) communication between the AP 102 and one of the STAs 104, 106, 108. In some examples, the remaining parameters of the TWT agreement remain unchanged. Additionally or alternatively, the TWT negotiator 208 can modify one or more of the remaining parameters of the TWT agreement (e.g., timing, announcement mode, etc.) in addition to the non-TB communication modification.

In other examples, the TWT negotiator 208 can terminate the present TWT agreement and negotiate a new TWT agreement including non-trigger based (non-TB) communication between the AP 102 and one of the STAs 104, 106, 108. In some examples, the remaining parameters of the TWT agreement remain unchanged compared to the original TWT agreement. Additionally or alternatively, the TWT negotiator 208 can modify one or more of the remaining parameters of the new TWT agreement (e.g., timing, announcement mode, etc.) in addition to the non-TB communication modification. In yet other examples, the TWT negotiator 208 can suspend the in-place TWT agreement between the AP 102 and one of the STAs 104, 106, 108

The example TWT rule storer 210, included in or otherwise implemented by the example STA based target wake time controller 112 of FIG. 2, is capable of storing one or more parameters and/or characteristics associated with the AP 102 and/or one of the STAs 104, 106, 108. In some examples, the TWT rule storer 210 can store one or more TWT rules and/or agreements utilized by one of the STAs 104, 106, 108.

Further, the TWT rule storer 210 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The TWT rule storer 210 may additionally or alternatively be implemented by one or more double data rate (DDR) memories, such as DDR, DDR2, DDR3, mobile DDR (mDDR), etc. The TWT rule storer 210 may additionally or alternatively be implemented by one or more mass storage devices such as hard disk drive(s), compact disk drive(s), digital versatile disk drive(s), etc. While in the illustrated example the TWT rule storer 210 is illustrated as a single database, the TWT rule storer 210 may be implemented by any number and/or type(s) of databases. Further, the TWT rule storer 210 may be located in one of the STAs 104, 106, 108 or at a central location outside of one of the STAs 104, 106, 108. Furthermore, the data stored in the TWT rule storer 210 may be in any data format such as, for example, binary data, comma delimited data, tab delimited data, structured query language (SQL) structures, etc.

Figure 3:
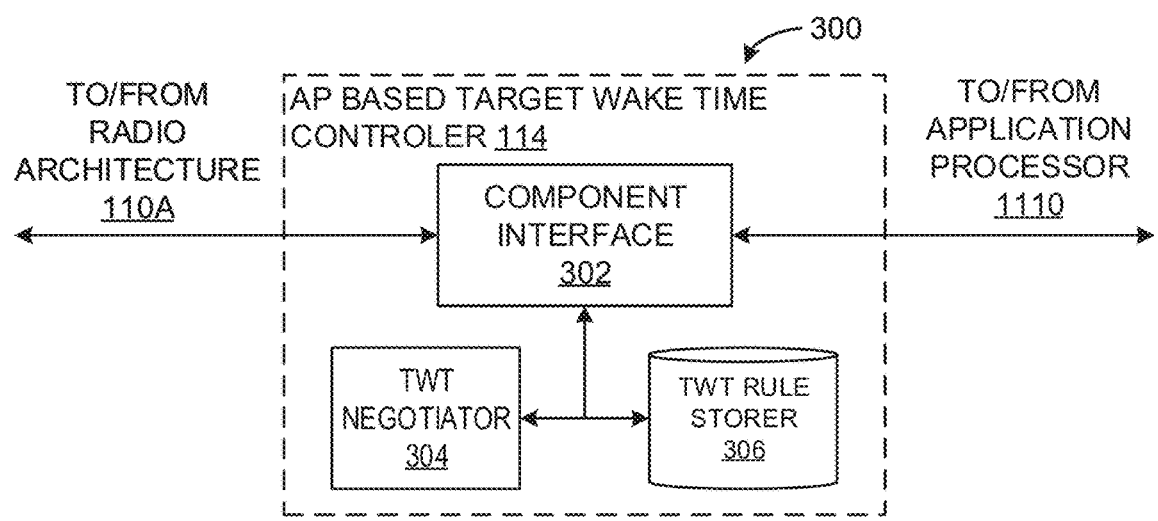
FIG. 3 is a block diagram of an example access point based target wake time controller of FIG. 1.

FIG. 3 is a block diagram of an example implementation 300 of the AP based target wake time controller 114 of FIG. 1, disclosed herein, to facilitate negotiation and/or modification of a TWT SP between the AP 102 and one or more of the STAs 104, 106, 108. The AP based target wake time controller 114 includes an example component interface 302, an example TWT negotiator 304, and an example TWT rule storer 306.

The example component interface 302 of FIG. 3 interfaces with the application processor 1110 to transmit signals (e.g., instructions to operate according to a protocol) and/or receive signals (e.g., instructions corresponding to a received preamble) from the example application processor 1110. Additionally, the example component interface 302 interfaces with the example radio architecture 110A to instruct the radio architecture 110A to transmit data packet/frames to and/or to receive data packets from the radio architecture(s) 110B,C,D.

The example TWT negotiator 304 of the example AP based target wake time controller 114 of FIG. 3, in some examples, is capable of negotiating and/or modifying one or more parameters of a target wake time (TWT) agreement between the corresponding one of the STAs 104, 106, 108 and the AP 102.

In some examples, the TWT negotiator 304 can at least of initialize a TWT service period (SP) between the AP 102 and one of the STAs 104, 106, 108 and/or maintain the TWT SP between the AP 102 and one of the STAs 104, 106, 108.

In some examples, the TWT negotiator 304 can query the component interface 302 of the AP 102 to determine whether the AP 102 has received a message from a respective one of the STAs 104, 106, 108. In response to the query returning no received messages, the TWT negotiator 304 can maintain the TWT SP. Conversely, in response to the query returning one or more messages from one of the STAs 104, 106, 108, the TWT negotiator 304 can access the contents of the message received by the AP 102. In such examples, determining the contents of the message further includes identifying which of the example STAs 104, 106, 108 sent the message.

In such examples, the TWT negotiator 304 determines whether the message includes at least one of an end of service period bit (EOSP) and its respective state and an uplink (UL) buffer status report and a respective quantity of data in queue in the buffer for one of the STAs 104, 106, 108. In response to the TWT negotiator 304 determining at least one of the EOSP bit indicates that the one of the STAs 104, 106, 108 is dozing or there is no data in queue in the buffer of the one of the STAs 104, 106, 108, the TWT negotiator 304 retrieves at least one of the downlink (DL) buffer status report or one or more frames sent from the AP 102 to one of the STAs 104, 106, 108 (e.g., the one or more frames, in some examples, including the EOSP bit) from the TWT rule storer 306.

In response to each of the EOSP bit indicating the TWT SP is to be terminated and the DL buffer status report indicating no data in queue, the TWT negotiator 304 terminates the TWT SP between the AP 102 and respective one of the STAs 104, 106, 108. Alternatively, in response to at least one of the EOSP bit indicating the TWT SP is to be maintained or the DL buffer status indicating a non-zero quantity of data in queue, the TWT negotiator 304 maintains the TWT SP between the AP 102 and respective one of the STAs 104, 106, 108. Similarly, in response to the TWT negotiator 304 determining there is a quantity of data in queue in the UL buffer of the one of the STAs 104, 106, 108, the TWT negotiator 304 maintains the TWT SP.

In other examples, the message retrieved from the component interface 302 by the TWT negotiator 304 includes an indication of whether the respective one of the STAs 104, 106, 108 can extend a service period (SP) (e.g., due to the STAs 104, 106, 108 not having any scheduled connections) or cannot extend the SP (e.g., based upon other connections (e.g., Wi-Fi connections, Bluetooth® connections, LTE connections, etc.) scheduled for the respective one of the STAs 104, 106, 108 and a device other than the AP 102 (e.g., a peer to peer connection with another station, a connection with an access point different than the AP 102, etc.)).

In such examples, in response to the message retrieved by the component interface 302 indicating the TWT SP cannot be extended, the TWT negotiator 304 terminates the TWT SP between the AP 102 and respective one of the STAs 104, 106, 108 at a previously scheduled (e.g., agreed upon) time. Conversely, in response to the message retrieved by the component interface 302 indicating the TWT SP can be extended, the TWT negotiator 304 determines whether data is queued in at least one of an uplink (UL) buffer of one of the STAs 104, 106, 108 and/or a downlink (DL) buffer of the AP 102. In response to determining data is in queue in at least one of an UL buffer or the DL buffer, the TWT negotiator 304 negotiates an extension to the TWT SP with one of the STAs 104, 106, 108 for at least a quantity of time to distribute the data queued in at least one of the UL buffer of the respective one of the STAs 104, 106, 108 and/or the DL buffer of the AP 102. Conversely, in response to determining no data is in queue, the TWT negotiator 304 determines the TWT SP between the AP 102 and respective one of the STAs 104, 106, 108 can be terminated at the scheduled time.

In yet other examples, the TWT negotiator 304 can determine the AP 102 and one of the STAs 104, 106, 108 are operating in a trigger based (TB) target wake time (TWT) mode based on an in-place target wake time (TWT) agreement between the AP 102 and one of the STAs 104, 106, 108. In such examples, this facilitates the enablement of multi user (MU) operation of the AP 102. Further, the TWT negotiator 304 can, in some examples, receive an MU bit set to 1 from one or more of the STAs 104, 106, 108, thereby disabling MU and TB operation.

In such examples, in response to receiving the MU bit set to 1 from one or more of the STAs 104, 106, 108, the TWT negotiator 304 can, in tandem with the TWT negotiator 208, negotiate at least one of a modified, replacement, and/or suspended TWT agreement. For example, the TWT negotiator 304 can negotiate a modified TWT agreement, the modified TWT agreement including non-trigger based (non-TB) communication between the AP 102 and one of the STAs 104, 106, 108. In some examples, the remaining parameters of the TWT agreement remain unchanged. Additionally or alternatively, the TWT negotiator 304 can modify one or more of the remaining parameters of the TWT agreement (e.g., timing, announcement mode, etc.) in addition to the non-TB communication modification.

In other examples, the TWT negotiator 304 can terminate the present TWT agreement and negotiate a new TWT agreement including non-trigger based (non-TB) communication between the AP 102 and one of the STAs 104, 106, 108. In some examples, the remaining parameters of the TWT agreement remain unchanged compared to the original TWT agreement. Additionally or alternatively, the TWT negotiator 304 can modify one or more of the remaining parameters of the new TWT agreement (e.g., timing, announcement mode, etc.) in addition to the non-TB communication modification. In yet other examples, the TWT negotiator 304 can suspend the in-place TWT agreement between the AP 102 and one of the STAs 104, 106, 108

The example TWT rule storer 306, included in or otherwise implemented by the example AP based target wake time controller 114 of FIG. 3, is capable of storing one or more parameters and/or characteristics associated with the AP 102 and/or one of the STAs 104, 106, 108. In some examples, the TWT rule storer 306 can store one or more TWT rules and/or agreements utilized by the example AP 102.

Further, the TWT rule storer 306 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The TWT rule storer 306 may additionally or alternatively be implemented by one or more double data rate (DDR) memories, such as DDR, DDR2, DDR3, mobile DDR (mDDR), etc. The TWT rule storer 306 may additionally or alternatively be implemented by one or more mass storage devices such as hard disk drive(s), compact disk drive(s), digital versatile disk drive(s), etc. While in the illustrated example the TWT rule storer 306 illustrated as a single database, the TWT rule storer 306 may be implemented by any number and/or type(s) of databases. Further, the TWT rule storer 306 can be located in the AP 102 or at a central location outside of the AP 102. Furthermore, the data stored in the TWT rule storer 306 may be in any data format such as, for example, binary data, comma delimited data, tab delimited data, structured query language (SQL) structures, etc.

While an example manner of implementing the example STA based target wake time controller 112 and/or the AP based target wake time controller 114 of FIG. 1 is illustrated in FIGS. 2 and/or 3, one or more of the elements, processes and/or devices illustrated in FIGS. 2 and/or 3 may be combined, divided, re-arranged, omitted, eliminated and/or implemented in any other way. Further, the example component interface 202, the example data manager 204, the example connection manager 206, the example TWT negotiator 208, the example component interface 302, the example TWT negotiator 304, and/or, more generally, the example STA based target wake time controller 112 and/or the example AP based target wake time controller 114 may be implemented by hardware, software, firmware and/or any combination of hardware, software and/or firmware. Thus, for example, any of the example component interface 202, the example data manager 204, the example connection manager 206, the example TWT negotiator 208, the example component interface 302, the example TWT negotiator 304, and/or, more generally, the example STA based target wake time controller 112 and/or the example AP based target wake time controller 114 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example STA based target wake time controller 112, the example AP based target wake time controller 114, the example component interface 202, the example data manager 204, the example connection manager 206, the example TWT negotiator 208, the example component interface 302, and/or the example TWT negotiator 304 is/are hereby expressly defined to include a non-transitory computer readable storage device or storage disk such as a memory, a digital versatile disk (DVD), a compact disk (CD), a Blu-ray disk, etc. including the software and/or firmware. Further still, the example STA based target wake time controller 112 and/or the example AP based target wake time controller 114 of FIG. 1 may include one or more elements, processes and/or devices in addition to, or instead of, those illustrated in FIGS. 2 and/or 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example STA based target wake time controller 112 and/or the example AP based target wake time controller 114 of FIG. 1 are shown in FIGS. 4-10. The machine readable instructions may be an executable program or portion of an executable program for execution by a computer processor such as the processor 1512 shown in the example processor platform 1500 discussed below in connection with FIG. 15. The program may be embodied in software stored on a non-transitory computer readable storage medium such as a CD-ROM, a floppy disk, a hard drive, a DVD, a Blu-ray disk, or a memory associated with the processor 1512, but the entire program and/or parts thereof could alternatively be executed by a device other than the processor 1512 and/or embodied in firmware or dedicated hardware. Further, although the example programs are described with reference to the flowcharts illustrated in FIGS. 4-10, many other methods of implementing the example STA based target wake time controller 112 and/or the example AP based target wake time controller 114 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4-10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 4:
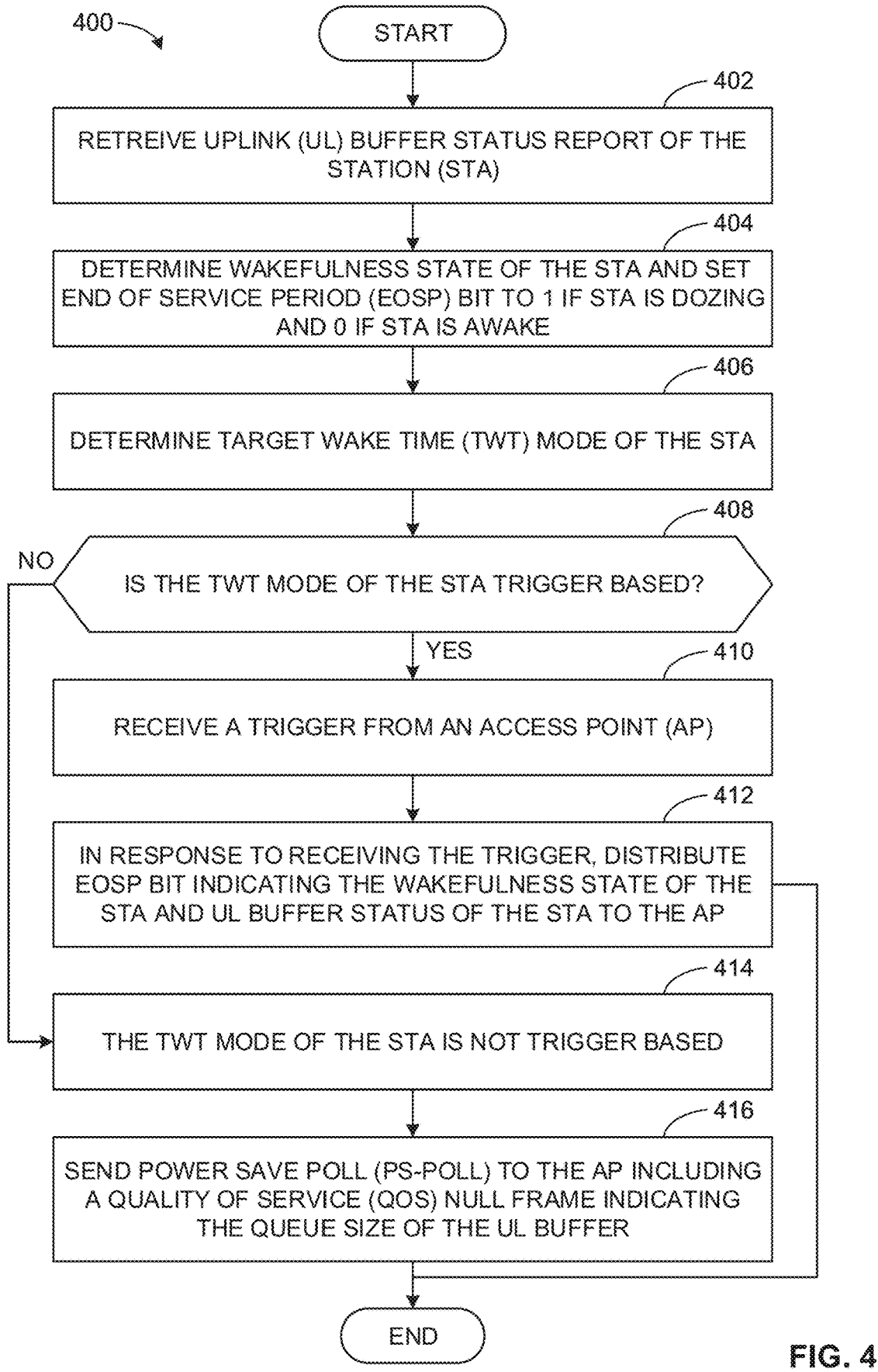
FIG. 4 is an example flowchart representative of machine readable instructions that may be executed to implement one or more of the stations of FIG. 1.

The program of FIG. 4 includes block 402 at which the example component interface 202 included in one of the example STAs 104, 106, 108 retrieves an uplink (UL) buffer status report from the data manager 204. In some examples, the status report includes an indication of a quantity of data (e.g., 300 kB, 2 MB, 12.6 MB, etc.) in queue in the buffer of at least one of the STAs 104, 106, 108. In response to the retrieval of the status report, processing proceeds to block 404.

At block 404, the TWT negotiator 208 determines a wakefulness state of the respective one of the STAs 104, 106, 108 as retrieved from the TWT rule storer 210. In some examples at block 404, the TWT negotiator 208 is further to set an end of service period (EOSP) bit to 0 if the respective one of the STAs 104, 106, 108 is awake (e.g., active) and set the EOSP bit to 1 if the respective one of the STAs 104, 106, 108 is dozing (e.g., sleeping, inactive, etc.). In other examples, the EOSP bit can be set to any value to indicate one of awake and/or dozing. In response to the setting of the EOSP bit, processing proceeds to block 406.

At block 406, the TWT negotiator 208 determines a target wake time (TWT) mode of the connection between the respective one of the STAs 104, 106, 108 and the example AP 102 as retrieved from the TWT rule storer 210. In some examples, the TWT mode can include at least one of trigger based communication or non-trigger based communication. At block 408, based on the TWT mode determination made at block 406, processing proceeds to block 410 if the TWT mode of the respective one of the example STAs 104, 106, 108 is determined to be trigger based. Alternatively, in response to determining the TWT mode of the respective one of the example STAs 104, 106, 108 is not trigger based, processing proceeds to block 414.

At block 410, in response to determining the TWT mode is trigger based, the component interface 202 awaits a trigger from the AP 102. In response to receiving the trigger from the AP 102, processing proceeds to block 412.

At block 412, in response to the component interface 202 receiving the trigger from the AP 102, the TWT negotiator 208 retrieves the previously set EOSP bit and the UL buffer status of the respective one of the STAs 104, 106, 108 and transmits each of the EOSP bit and the UL buffer status report to the AP 102 via the component interface 202 and at least one of the radio architecture(s) 110A,B,C,D and the program 400 of FIG. 4 ends.

At block 414, the TWT negotiator 208 determines that the target wake time mode is not trigger based (e.g., non-trigger based, etc.). In some examples at block 414, the TWT negotiator 208 is further to store an indication of the TWT mode in the TWT rule storer 210 and processing proceeds to block 416. At block 416, the TWT negotiator 208 retrieves the UL buffer status of the respective one of the STAs 104, 106, 108. Additionally, the TWT negotiator 208 transmits the UL buffer status report indicating a queue size of the UL buffer to the AP 102 via the component interface 202 and at least one of the radio architecture(s) 110A,B,C,D via a power save poll (e.g., a PS-Poll) including a Quality of Service (QoS) null frame indicating the queue size. In response to the transmittal of the PS-Poll, the program 400 of FIG. 4 ends.

Figure 5:
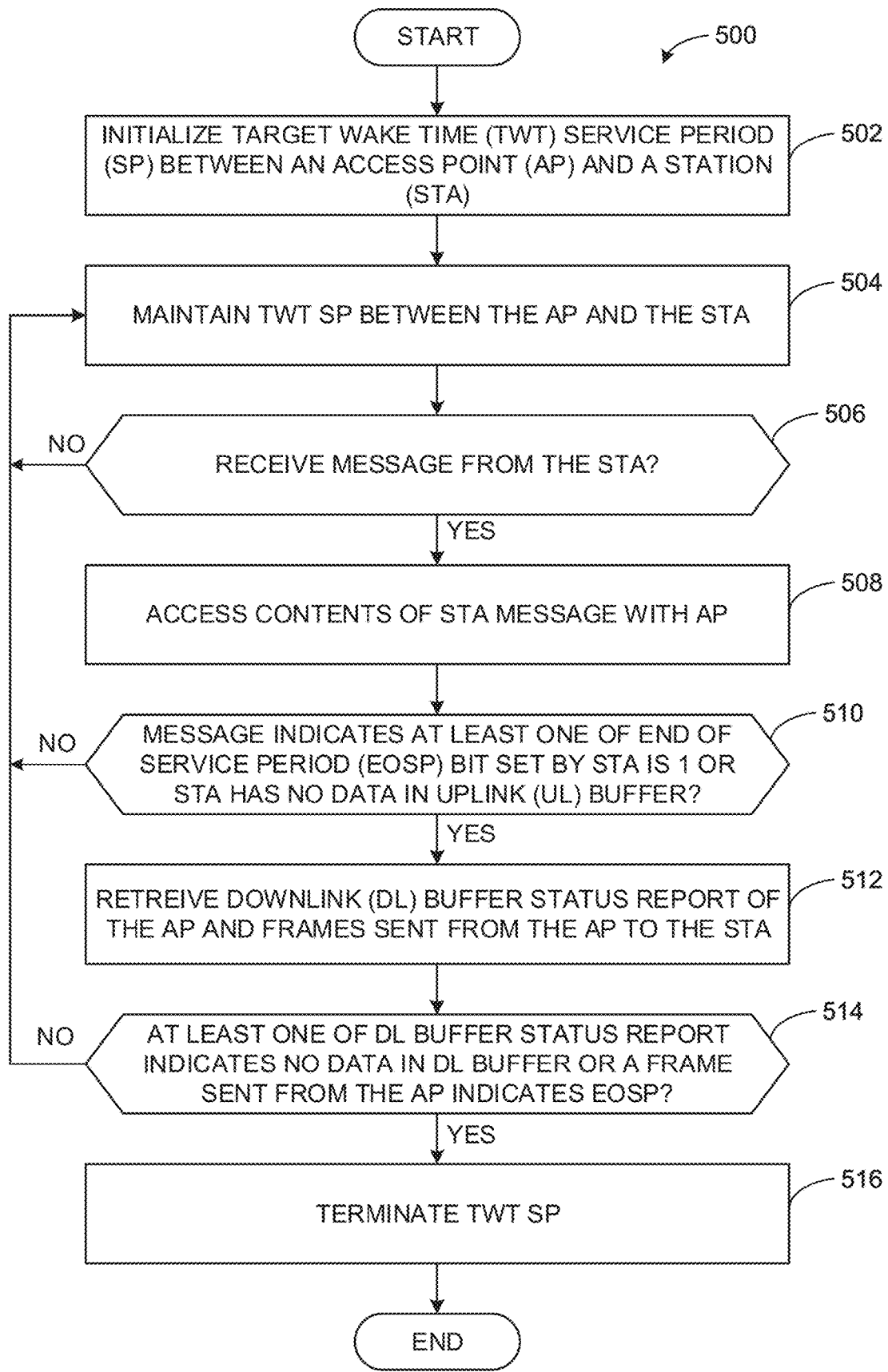
FIG. 5 is an example flowchart representative of machine readable instructions that may be executed to implement the access point of FIG. 1.

The program of FIG. 5 includes block 502 at which the example target wake time negotiator 304 included in the example AP 102, in communication with the example TWT negotiator 208 in one of the example STAs 104, 106, 108, initializes a TWT service period (SP) between the AP 102 and one of the STAs 104, 106, 108. In response to the initialization of the TWT SP, processing proceeds to block 504 where the TWT negotiator 304 maintains the TWT SP between the AP 102 and one of the STAs 104, 106, 108.

At block 506, the TWT negotiator 304 queries the component interface 302 of the AP 102 to determine whether the AP 102 has received a message from a respective of the STAs 104, 106, 108. In response to the query returning no received messages, processing returns to block 504 where the TWT negotiator 304 maintains the TWT SP. Conversely, in response to the query returning one or more messages from one of the STAs 104, 106, 108, processing proceeds to block 508 at which the TWT negotiator 304 accesses the contents of the message received by the AP 102. In some examples, determining the contents of the message further includes identifying which of the example STAs 104, 106, 108 sent the message.

At block 510, the TWT negotiator 304 determines whether the message includes at least one of an end of service period bit (EOSP) and its respective state and an uplink (UL) buffer status report and a respective quantity of data in queue in the buffer for one of the STAs 104, 106, 108. In response to the TWT negotiator 304 determining at least one of the EOSP bit indicates the one of the STAs 104, 106, 108 is dozing or there is no data in queue in the buffer of the one of the STAs 104, 106, 108, processing proceeds to block 512. Alternatively, in response to the TWT negotiator 304 determining at least one of the EOSP bit indicates the one of the STAs 104, 106, 108 is awake or there is a quantity of data in queue in the buffer of the one of the STAs 104, 106, 108, processing returns to block 504.

At block 512, the TWT negotiator 304 retrieves at least one of the downlink (DL) buffer status report or one or more frames sent from the AP 102 to one of the STAs 104, 106, 108 (e.g., the one or more frames, in some examples, including the EOSP bit) from the TWT rule storer 306.

At block 514, based on the data retrieved from the TWT rule storer 306, the TWT negotiator 304 determines whether the EOSP indicates the TWT SP is to be terminated and/or whether the DL buffer status report indicates a non-zero quantity of queued data to be distributed to one of the STAs 104, 106, 108. In response to each of the EOSP bit indicating the TWT SP is to be terminated and the DL buffer status report indicating no data in queue, processing proceeds to block 516. Alternatively, in response to at least one of the EOSP bit indicating the TWT SP is to be maintained or the DL buffer status indicating a non-zero quantity of data in queue, processing returns to block 504 where the TWT negotiator 304 maintains the TWT SP between the AP 102 and respective one of the STAs 104, 106, 108.

At block 516, the TWT negotiator 304 terminates the TWT SP between the AP 102 and respective one of the STAs 104, 106, 108 and the program 500 of FIG. 5 ends.

Figure 6:
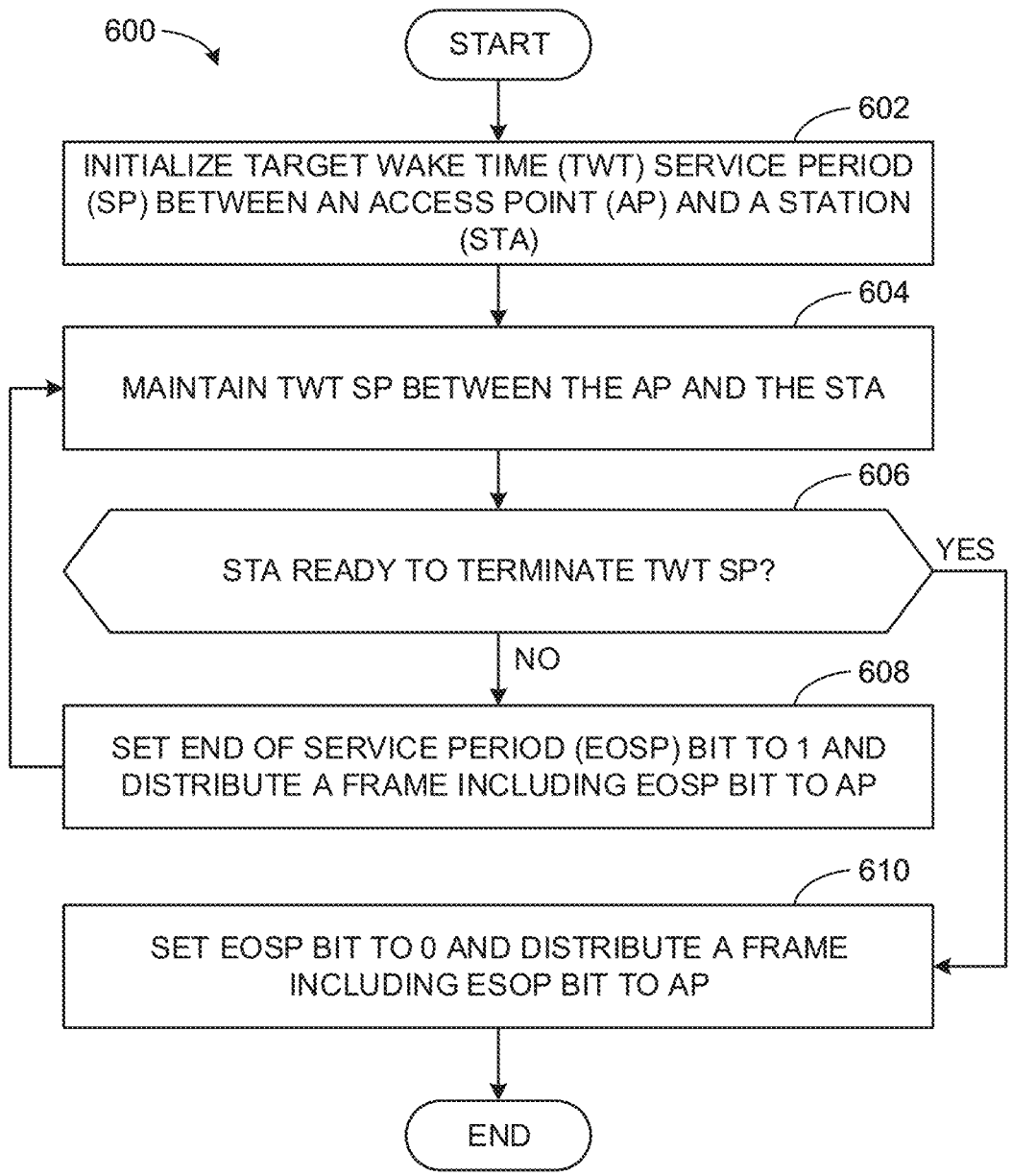
FIG. 6 is an example flowchart representative of machine readable instructions that may be executed to implement one or more of the stations of FIG. 1.

The program of FIG. 6 includes block 602 at which the example target wake time negotiator 208 included in at least one of the example STAs 104, 106, 108, in communication with the example TWT negotiator 304 of the example AP 102, initializes a TWT service period (SP) between the AP 102 and one of the STAs 104, 106, 108. In response to the initialization of the TWT SP, processing proceeds to block 604 where the TWT negotiator 208 maintains the TWT SP between the AP 102 and one of the STAs 104, 106, 108.

At block 606, the TWT negotiator 208 queries at least one of the data manager 204 or the connection manager 206 to determine whether the respective one of the STAs 104, 106, 108 is ready to terminate the TWT SP. In some examples, the TWT negotiator 208 determines the TWT SP can be terminated in response to the query of the data manger 204 returning an indication that there is no data queued in the UL buffer. In other examples, the TWT negotiator 208 determines the TWT SP can be terminated in response to the query of the connection manager 206 indicating a scheduled connection between the respective one of the STAs 104, 106, 108 and a device other than the AP 102. In response to determining the respective one of the STAs 104, 106, 108 is ready to terminate the TWT SP, processing returns to block 610. Conversely, in response to determining the respective one of the STAs 104, 106, 108 is not ready to terminate the TWT SP, processing proceeds to block 608.

At block 608, the TWT negotiator 208 sets an end of service period (EOSP) bit to 1 (e.g., maintain the TWT SP) and distributes a frame including the EOSP bit to the AP 102 via the component interface 202 and at least one of the radio architecture(s) 110A,B,C,D. In other examples, an EOSP bit set to 0 can denote the TWT SP is to be maintained. In response to the distribution of the EOSP bit, processing returns to block 604.

At block 610, the TWT negotiator 208 sets an end of service period (EOSP) bit to 0 (e.g., terminate the TWT SP) and distributes a frame including the EOSP bit to the AP 102 via the component interface 202 and at least one of the radio architecture(s) 110A,B,C,D. In other examples, an EOSP bit set to 1 can denote the TWT SP is to be terminated. In response to the distribution of the EOSP bit, the program 600 of FIG. 6 ends.

Figure 7:
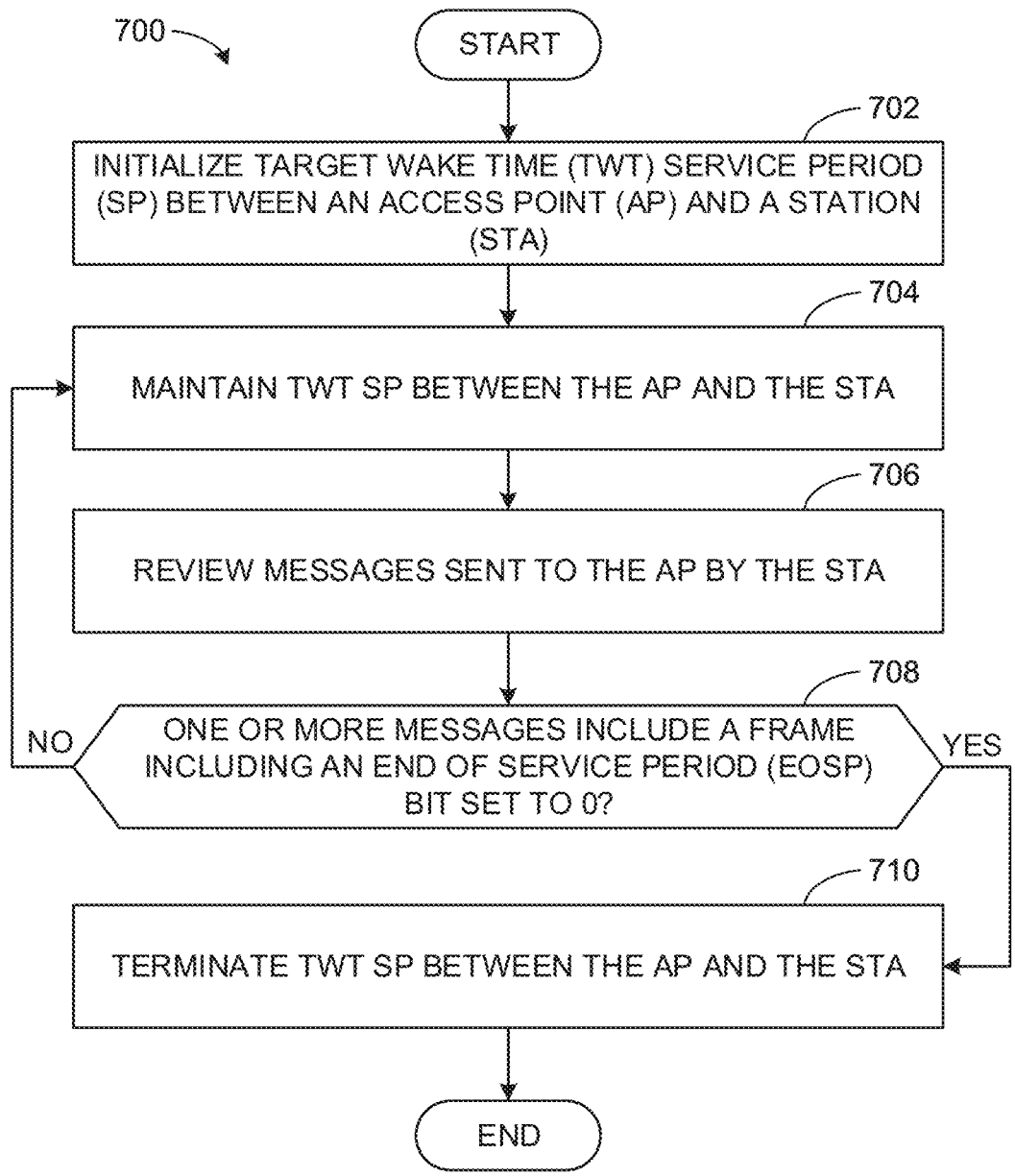
FIG. 7 is an example flowchart representative of machine readable instructions that may be executed to implement the access point of FIG. 1.

The program of FIG. 7 includes block 702 at which the example target wake time negotiator 304 included in the AP 102, in communication with the example TWT negotiator 208 of at least one of the example STAs 104, 106, 108, initializes a TWT service period (SP) between the AP 102 and one of the STAs 104, 106, 108. In response to the initialization of the TWT SP, processing proceeds to block 704 where the TWT negotiator 208 maintains the TWT SP between the AP 102 and one of the STAs 104, 106, 108.

At block 706, the TWT negotiator 304 queries the component interface 302 of the AP 102 to determine whether the AP 102 has received a message from a respective of the STAs 104, 106, 108. In some examples, in response to the query returning one or more messages, the TWT negotiator 304 accesses the contents of the message received by the AP 102. In some examples, accessing the contents of the message further includes identifying which of the example STAs 104, 106, 108 sent the message.

At block 708, the TWT negotiator 304 determines whether one or more of the message includes a frame including an end of service period (EOSP) bit set to 0 (e.g., the TWT SP is set to be terminated). In other examples, the EOSP bit set to 1 can be used to indicate the TWT SP is to be terminated. In either case, in response to the frame indicating the TWT SP is to be terminated, processing proceeds to block 710. Conversely, in response to the frame indicating the TWT SP is not to be terminated, processing returns to block 704 where the TWT negotiator 304 maintains the TWT SP.

At block 710, the TWT negotiator 304 terminates the TWT SP between the AP 102 and respective one of the STAs 104, 106, 108 and the program 700 of FIG. 7 ends.

Figure 8:
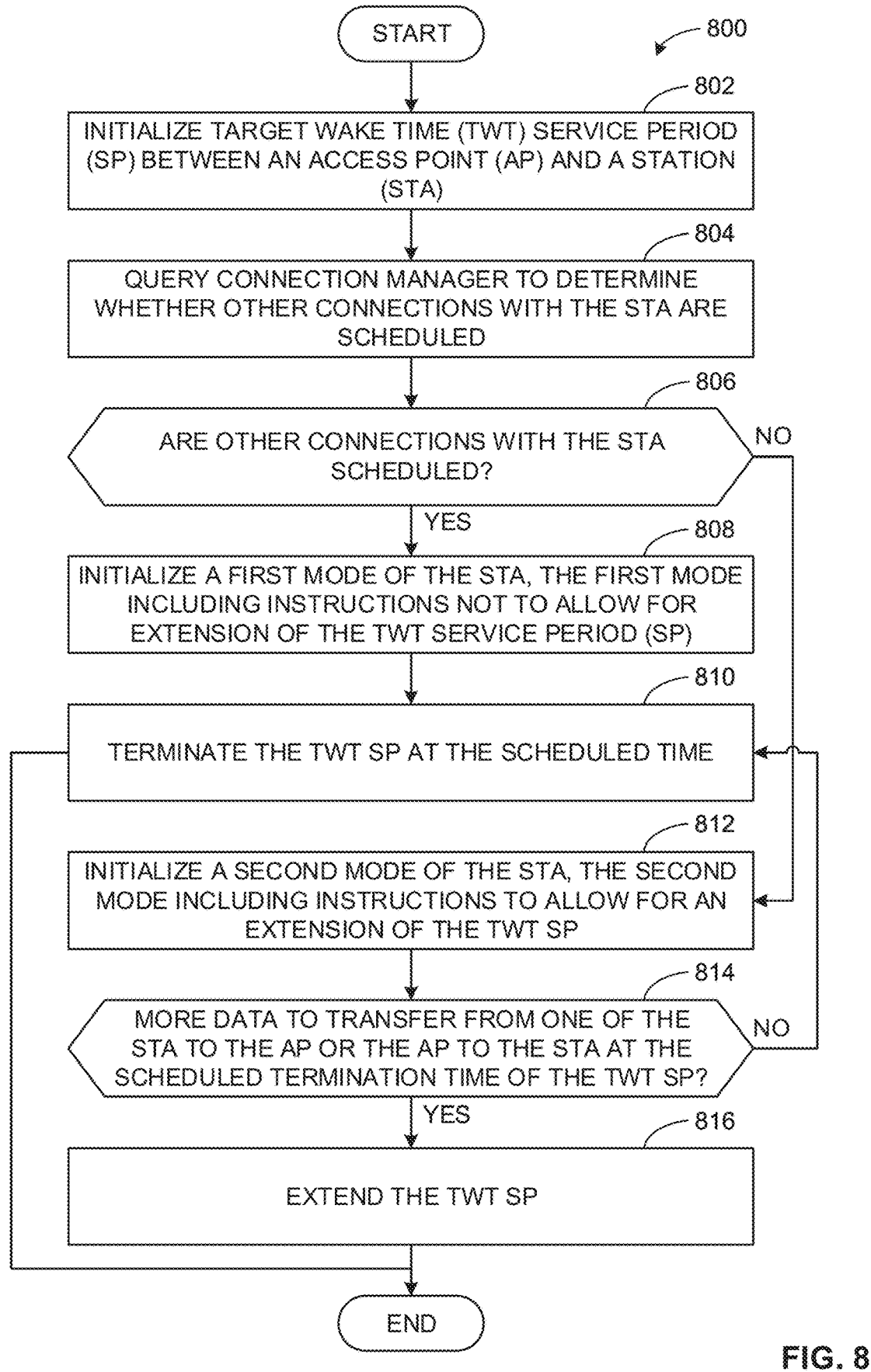
FIG. 8 is an example flowchart representative of machine readable instructions that may be executed to implement one or more of the stations of FIG. 1.

The program of FIG. 8 includes block 802 at which the example target wake time negotiator 208 included in at least one of the example STAs 104, 106, 108, in communication with the example TWT negotiator 304 of the example AP 102, initializes a TWT service period (SP) between the AP 102 and one of the STAs 104, 106, 108. In response to the initialization of the TWT SP, processing proceeds to block 804.

At block 804, the TWT negotiator 208 queries the connection manager 206 to determine whether other connections (e.g., Wi-Fi connections, Bluetooth® connections, LTE connections, etc.) are scheduled for the respective one of the STAs 104, 106, 108 and a device other than the AP 102 (e.g., a peer to peer connection with another station, a connection with an access point different than the AP 102, etc.).

At block 806, in response to the query of the connection manager 206 determining other connections with the respective one of the STAs 104, 106, 108 are scheduled, processing proceeds to block 808. Conversely, in response to the query of the connection manager 206 determining no other connections are scheduled, processing proceeds to block 812.

At block 808, the TWT negotiator 208 initializes a first mode for the respective one of the STAs 104, 106, 108, the first mode including instructions to not allow for an extension of the TWT service period (e.g., in order to facilitate the scheduled connections of the respective one of the STAs 104, 106, 108 and a device other than the AP 102). In response to initialization of the first mode, processing proceeds to block 810, where the TWT negotiator 208 terminates the TWT SP between the AP 102 and respective one of the STAs 104, 106, 108 at a previously scheduled (e.g., agreed upon) time and the example program 800 of FIG. 8 ends.

At block 812, the TWT negotiator 208 initializes a second mode for the respective one of the STAs 104, 106, 108, the second mode including instructions to allow for an extension of the TWT service period (e.g., due to a lack of constraints related to other scheduled connections of the respective one of the STAs 104, 106, 108 and in order to facilitate additional data transfer between the respective one of the STAs 104, 106, 108 and the AP 102).

At block 814, in response to determining the TWT SP can be extended, the TWT negotiator 208 queries the data manager 204 to determine whether data is queued in at least one of an uplink (UL) buffer of one of the STAs 104, 106, 108 and/or a downlink (DL) buffer of the AP 102. In response to determining data is in queue in at least one of an UL buffer or the DL buffer, processing proceeds to block 816. Conversely, in response to determining no data is in queue, processing returns to block 810 where the TWT negotiator 208 determines the TWT SP between the AP 102 and respective one of the STAs 104, 106, 108 can be terminated at the scheduled time and the program 800 of FIG. 8 ends.

At block 816, the TWT negotiator 208 negotiates an extension to the TWT SP with the AP 102 for at least a quantity of time to distribute the data queued in at least one of the UL buffer of the respective one of the STAs 104, 106, 108 and/or the DL buffer of the AP 102 and the program 800 of FIG. 8 ends.

Figure 9:
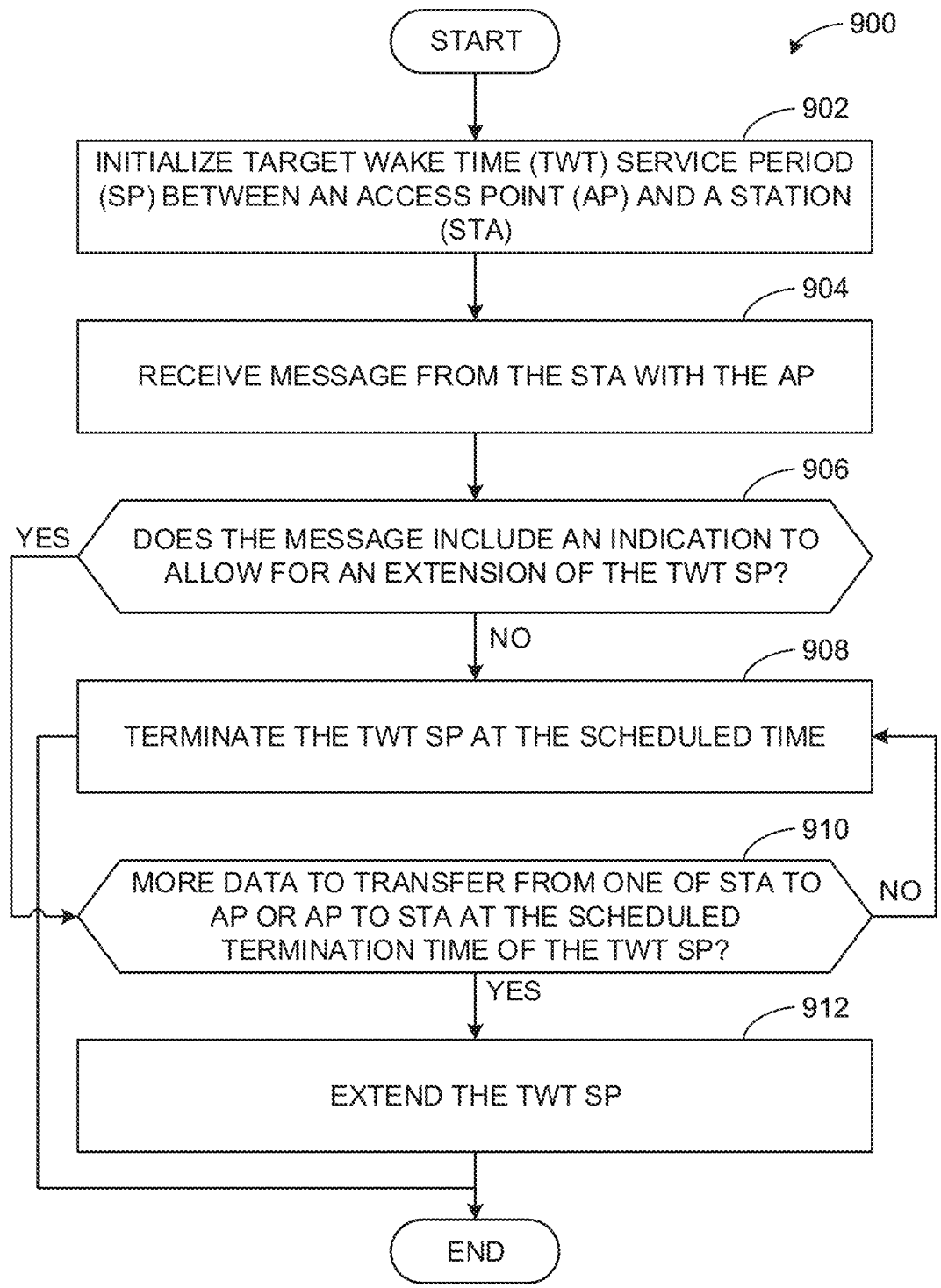
FIG. 9 is an example flowchart representative of machine readable instructions that may be executed to implement the access point of FIG. 1.

The program of FIG. 9 includes block 902 at which the example target wake time negotiator 304 included in the AP 102, in communication with the example TWT negotiator 208 of at least one of the example STAs 104, 106, 108, initializes a TWT service period (SP) between the AP 102 and one of the STAs 104, 106, 108. In response to the initialization of the TWT SP, processing proceeds to block 904.

At block 904, the TWT negotiator 304 reviews one or more messages receives from one of the STAs 104, 106, 108, the message retrieved by the component interface 302 via one or more of the radio architecture(s) 110A,B,C,D. In some examples, the message includes an indication of whether the respective one of the STAs 104, 106, 108 can extend a service period (SP) (e.g., due to the STAs 104, 106, 108 not having any scheduled connections) or cannot extend the SP (e.g., based upon other connections (e.g., Wi-Fi connections, Bluetooth® connections, LTE connections, etc.) scheduled for the respective one of the STAs 104, 106, 108 and a device other than the AP 102 (e.g., a peer to peer connection with another station, a connection with an access point different than the AP 102, etc.)).

At block 906, in response to the message retrieved by the component interface 302 indicating the TWT SP cannot be extended, processing proceeds to block 908. Conversely, in response to the message indicating the SP can be extended, processing proceeds to block 910.

At block 908, the TWT negotiator 304 terminates the TWT SP between the AP 102 and respective one of the STAs 104, 106, 108 at a previously scheduled (e.g., agreed upon) time and the example program 900 of FIG. 9 ends.

At block 910, in response to determining the TWT SP can be extended, the TWT negotiator 304 determines whether data is queued in at least one of an uplink (UL) buffer of one of the STAs 104, 106, 108 and/or a downlink (DL) buffer of the AP 102. In response to determining data is in queue in at least one of an UL buffer or the DL buffer, processing proceeds to block 912. Conversely, in response to determining no data is in queue, processing returns to block 908 where the TWT negotiator 304 determines the TWT SP between the AP 102 and respective one of the STAs 104, 106, 108 can be terminated at the scheduled time and the program 900 of FIG. 9 ends.

At block 912, the TWT negotiator 304 negotiates an extension to the TWT SP with one of the STAs 104, 106, 108 for at least a quantity of time to distribute the data queued in at least one of the UL buffer of the respective one of the STAs 104, 106, 108 and/or the DL buffer of the AP 102 and the program 900 of FIG. 9 ends.

Figure 10:
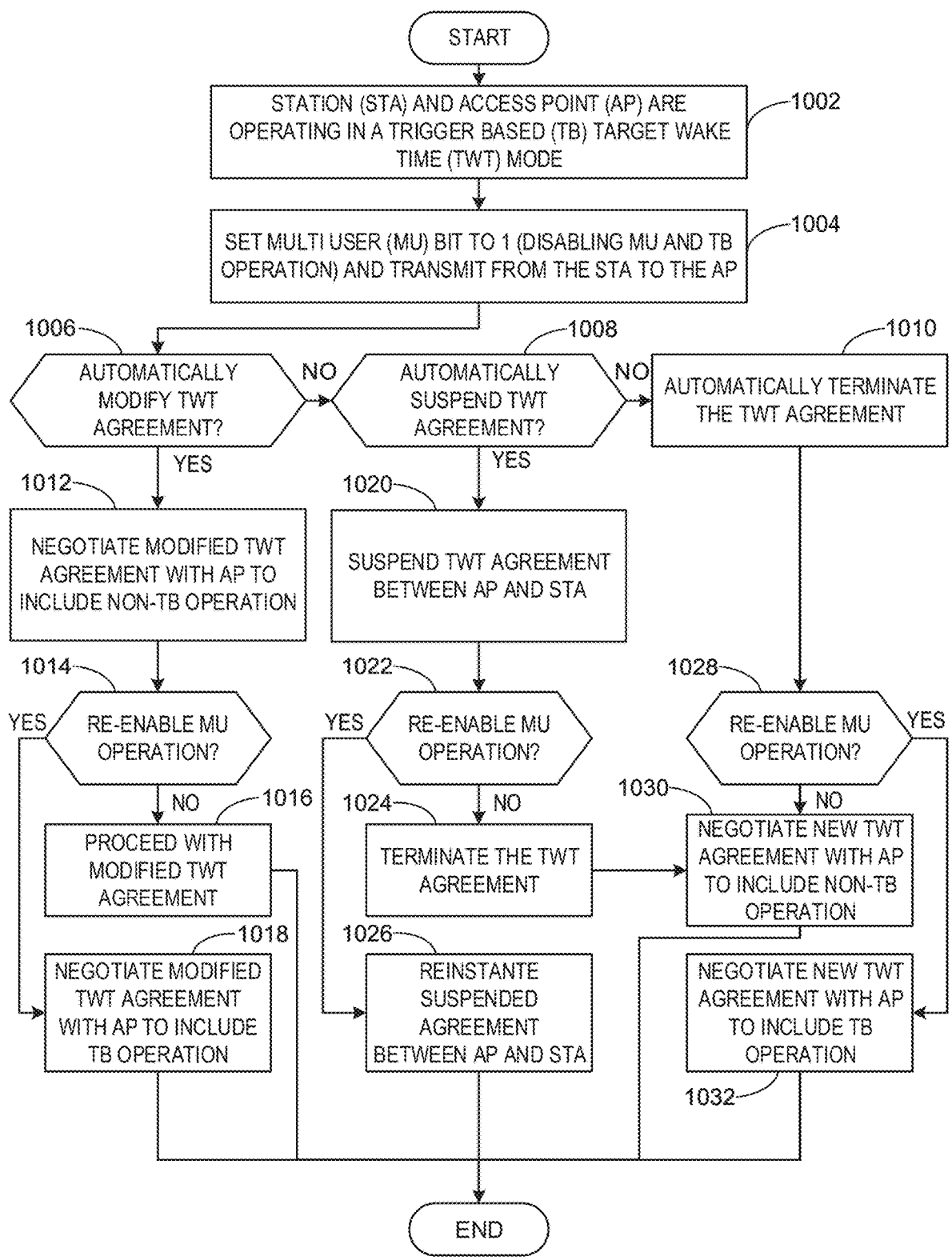
FIG. 10 is an example flowchart representative of machine readable instructions that may be executed to initialize a target wake time negotiation between the access point and one or more of the stations of FIG. 1.

The program of FIG. 10 includes block 1002 at which the TWT negotiator(s) 208, 304 determine the AP 102 and one of the STAs 104, 106, 108 are operating in a trigger based (TB) target wake time (TWT) mode based on an in-place target wake time (TWT) agreement between the AP 102 and one of the STAs 104, 106, 108. In some examples, this facilitates the enablement of multi user (MU) operation of the AP 102. At block 1004, the TWT negotiator 208 sets the MU bit to 1, thereby disabling MU and TB operation, and transmits the bit in a frame to the AP 102 via the component interface 202 and at least one of the radio architecture(s) 110A,B,C,D. While in the illustrated example setting the MU bit to 1 disables MU operation, any other state of the MU bit (e.g., 0, low, etc.) can be used to disable MU operation.

At block 1006, the TWT negotiator(s) 208, 304 determine whether it is desired to automatically modify the in-place TWT agreement between the AP 102 and one of the STAs 104, 106, 108. In response to determining it is desired to automatically modify the in-place TWT agreement, processing proceeds to block 1012. Conversely, in response to determining it is not desired to automatically modify the TWT agreement between the AP 102 and one of the STAs 104, 106, 108, processing proceeds to block 1008.

At block 1008, the TWT negotiator(s) 208, 304 determine whether it is desired to automatically suspend (e.g., place on hold) the in-place TWT agreement between the AP 102 and one of the STAs 104, 106, 108. In response to determining it is desired to automatically suspend the in-place TWT agreement, processing proceeds to block 1022. Conversely, in response to determining it is not desired to automatically suspend the TWT agreement between the AP 102 and one of the STAs 104, 106, 108, processing proceeds to block 1010.

At block 1010, in response to determining it is desired to neither automatically modify or suspend the TWT agreement between the AP 102 and one of the STAs 104, 106, 108, the TWT negotiator(s) 208, 304 determine it is desired to automatically terminate (e.g., cancel, tear down, etc.) the TWT agreement and processing proceeds to block 1028.

At block 1012, the TWT negotiator(s) 208, 304 negotiate a modified TWT agreement, the modified TWT agreement including non-trigger based (non-TB) communication between the AP 102 and one of the STAs 104, 106, 108. In some examples, the remaining parameters of the TWT agreement remain unchanged. Additionally or alternatively, the TWT negotiator(s) 208, 304 can modify one or more of the remaining parameters of the TWT agreement (e.g., timing, announcement mode, etc.) in addition to the non-TB communication modification. In response to the initialization of the modified TWT agreement, processing proceeds to block 1014.

At block 1014, the TWT negotiator(s) 208, 304 determine whether it is desired to re-enable multi-user (MU) operation. In response to determining it is desired to re-enable MU operation, processing proceeds to block 1018. Conversely, in response to determining it is not desired to re-enable MU operation (e.g., MU operation remains disabled), processing proceeds to block 1016.

At block 1016, in response to determining re-enablement of MU operation is not desired (e.g., trigger based communication is not re-enabled), the TWT negotiator(s) 208, 304 proceed with the modified TWT agreement negotiated at block 1012 and the program 1000 of FIG. 10 ends.

At block 1018, in response to determining re-enablement of MU operation is desired (e.g., trigger based communication is re-enabled), the TWT negotiator(s) 208, 304 negotiate a second modified TWT agreement similar to the original TWT agreement, the modified TWT agreement including TB communication between the AP 102 and one of the STAs 104, 106, 108. In response to initialization of the second modified TWT agreement, the program 1000 of FIG. 10 ends.

At block 1020, the TWT negotiator(s) 208, 304 suspend the in-place TWT agreement between the AP 102 and one of the STAs 104, 106, 108. At block 1022, in response to the suspension of the in-place TWT agreement, the TWT negotiator(s) 208, 304 determine whether it is desired to re-enable multi-user (MU) operation. In response to determining it is desired to re-enable MU operation, processing proceeds to block 1026. Conversely, in response to determining it is not desired to re-enable MU operation (e.g., MU operation remains disabled), processing proceeds to block 1024.

At block 1024, in response to determining MU operation and, accordingly, TB communication between the AP 102 and one of the STAs 104, 106, 108, is not to be re-enabled, the TWT negotiator(s) 208, 304 terminate (e.g., cancel, tear down, etc.) the TWT agreement and processing proceeds to block 1030.

At block 1026, in response to determining MU operation and, accordingly, TB communication between the AP 102 and one of the STAs 104, 106, 108 is to be re-enabled, the TWT negotiator(s) 208, 304 reinstate the suspended TWT agreement (e.g., the parameters of the reinstated TWT agreement matching the original TWT agreement) and the program 1000 of FIG. 10 ends.

At block 1028, the TWT negotiator(s) 208, 304 determine whether it is desired to re-enable multi-user (MU) operation. In response to determining it is desired to re-enable MU operation, processing proceeds to block 1032. Conversely, in response to determining it is not desired to re-enable MU operation (e.g., MU operation remains disabled) and the program 1000 of FIG. 10 ends.

At block 1030, in response to the re-enablement of MU operation and the termination of the original TWT agreement, the TWT negotiator(s) 208, 304 negotiate a new TWT agreement including non-trigger based (non-TB) communication between the AP 102 and one of the STAs 104, 106, 108. In some examples, the remaining parameters of the TWT agreement remain unchanged compared to the original TWT agreement from block 1002. Additionally or alternatively, the TWT negotiator(s) 208, 304 can modify one or more of the remaining parameters of the new TWT agreement (e.g., timing, announcement mode, etc.) in addition to the non-TB communication modification. In response to initialization of the negotiated TWT agreement, the program 1000 of FIG. 10 ends.

At block 1032, in response to MU operation remaining disabled and the termination of the original TWT agreement, the TWT negotiator(s) 208, 304 negotiate a new TWT agreement including TB communication between the AP 102 and one of the STAs 104, 106, 108. In some examples, the remaining parameters of the TWT agreement remain unchanged compared to the original TWT agreement from block 1002. Additionally or alternatively, the TWT negotiator(s) 208, 304 can modify one or more of the remaining parameters of the new TWT agreement (e.g., timing, announcement mode, etc.) in addition to the TB communication modification. In response to initialization of the negotiated TWT agreement, the program 1000 of FIG. 10 ends.

Figure 11:
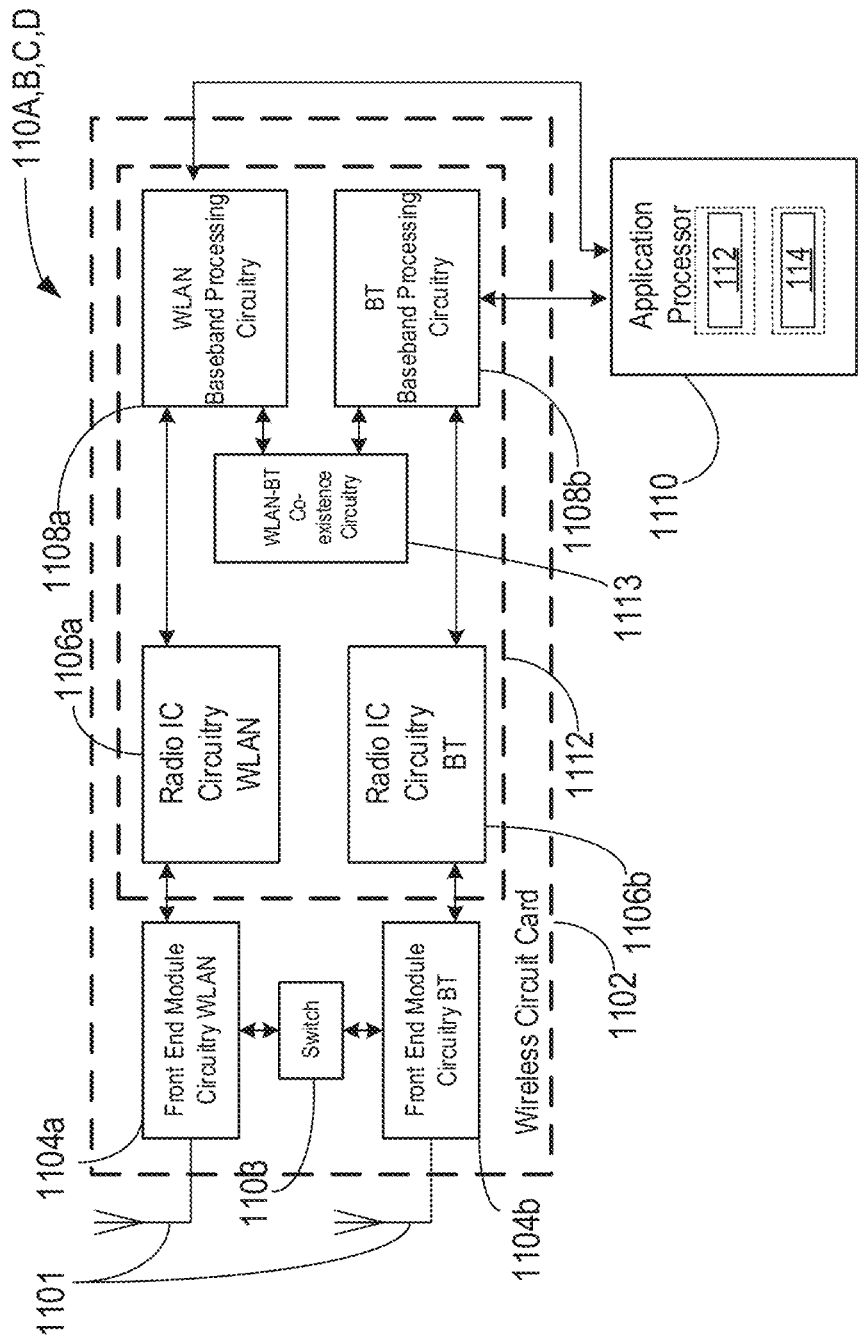
FIG. 11 is a block diagram of a radio architecture in accordance with some examples.

FIG. 11 is a block diagram of a radio architecture 110A, B,C,D in accordance with some embodiments that may be implemented in any one of the example AP 102 and/or the example STAs 104, 106, 108 of FIG. 1. Radio architecture 110A,B,C,D may include radio front-end module (FEM) circuitry 1104a-b, radio IC circuitry 1106a-b and baseband processing circuitry 1108a-b. Radio architecture 110A,B, C,D as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1104a-b may include a WLAN or Wi-Fi FEM circuitry 1104a and a Bluetooth (BT) FEM circuitry 1104b. The WLAN FEM circuitry 1104a may include a receive signal path comprising circuitry configured to operate on WLAN RF signals received from one or more antennas 1101, to amplify the received signals and to provide the amplified versions of the received signals to the WLAN radio IC circuitry 1106a for further processing. The BT FEM circuitry 1104b may include a receive signal path which may include circuitry configured to operate on BT RF signals received from one or more antennas 1101, to amplify the received signals and to provide the amplified versions of the received signals to the BT radio IC circuitry 1106b for further processing. FEM circuitry 1104a may also include a transmit signal path which may include circuitry configured to amplify WLAN signals provided by the radio IC circuitry 1106a for wireless transmission by one or more of the antennas 1101. In addition, FEM circuitry 1104b may also include a transmit signal path which may include circuitry configured to amplify BT signals provided by the radio IC circuitry 1106b for wireless transmission by the one or more antennas. In the embodiment of FIG. 11, although FEM 1104a and FEM 1104b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1106a-b as shown may include WLAN radio IC circuitry 1106a and BT radio IC circuitry 1106b. The WLAN radio IC circuitry 1106a may include a receive signal path which may include circuitry to down-convert WLAN RF signals received from the FEM circuitry 1104a and provide baseband signals to WLAN baseband processing circuitry 1108a. BT radio IC circuitry 1106b may in turn include a receive signal path which may include circuitry to down-convert BT RF signals received from the FEM circuitry 1104b and provide baseband signals to BT baseband processing circuitry 1108b. WLAN radio IC circuitry 1106a may also include a transmit signal path which may include circuitry to up-convert WLAN baseband signals provided by the WLAN baseband processing circuitry 1108a and provide WLAN RF output signals to the FEM circuitry 1104a for subsequent wireless transmission by the one or more antennas 1101. BT radio IC circuitry 1106b may also include a transmit signal path which may include circuitry to up-convert BT baseband signals provided by the BT baseband processing circuitry 1108b and provide BT RF output signals to the FEM circuitry 1104b for subsequent wireless transmission by the one or more antennas 1101. In the embodiment of FIG. 11, although radio IC circuitries 1106a and 1106b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1108*a-b* may include a WLAN baseband processing circuitry 1108*a* and a BT baseband processing circuitry 1108*b*. The WLAN baseband processing circuitry 1108*a* may include a memory, such as, for example, a set of RAM arrays in a Fast Fourier Transform or Inverse Fast Fourier Transform block (not shown) of the WLAN baseband processing circuitry 1108*a*. Each of the WLAN baseband circuitry 1108*a* and the BT baseband circuitry 1108*b* may further include one or more processors and control logic to process the signals received from the corresponding WLAN or BT receive signal path of the radio IC circuitry 1106*a-b*, and to also generate corresponding WLAN or BT baseband signals for the transmit signal path of the radio IC circuitry 1106*a-b*. Each of the baseband processing circuitries 1108*a* and 1108*b* may further include physical layer (PHY) and medium access control layer (MAC) circuitry for generation and processing of the baseband signals and for controlling operations of the radio IC circuitry 1106*a-b*.

Referring still to FIG. 11, according to the shown embodiment, WLAN-BT coexistence circuitry 1113 may include logic providing an interface between the WLAN baseband circuitry 1108*a* and the BT baseband circuitry 1108*b* to enable use cases requiring WLAN and BT coexistence. In addition, a switch 1103 may be provided between the WLAN FEM circuitry 1104*a* and the BT FEM circuitry 1104*b* to allow switching between the WLAN and BT radios according to application needs. In addition, although the antennas 1101 are depicted as being respectively connected to the WLAN FEM circuitry 1104*a* and the BT FEM circuitry 1104*b*, embodiments include within their scope the sharing of one or more antennas as between the WLAN and BT FEMs, or the provision of more than one antenna connected to each of FEM 1104*a* or 1104*b*.

In some embodiments, the front-end module circuitry 1104*a-b*, the radio IC circuitry 1106*a-b*, and baseband processing circuitry 1108*a-b* may be provided on a single radio card, such as wireless radio card 1102. In some other embodiments, the one or more antennas 1101, the FEM circuitry 1104*a-b* and the radio IC circuitry 1106*a-b* may be provided on a single radio card. In some other embodiments, the radio IC circuitry 1106*a-b* and the baseband processing circuitry 1108*a-b* may be provided on a single chip or integrated circuit (IC), such as IC 1112.

In some embodiments, the wireless radio card 1102 may include a WLAN radio card and may be configured for Wi-Fi communications, although the scope of the embodiments is not limited in this respect. In some of these embodiments, the radio architecture 110A,B,C,D may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 110A,B,C,D may be part of a Wi-Fi communication station (STA) such as a wireless access point (AP), a base station or a mobile device including a Wi-Fi device. In some of these embodiments, radio architecture 110A,B,C,D may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 110A,B,C,D may also be suitable to transmit and/or receive communications in accordance with other techniques and standards.

In some embodiments, the radio architecture 110A,B,C,D may be configured for high-efficiency Wi-Fi (HEW) communications in accordance with the IEEE 802.11ax standard. In these embodiments, the radio architecture 110A,B,C,D may be configured to communicate in accordance with an OFDMA technique, although the scope of the embodiments is not limited in this respect.

In some other embodiments, the radio architecture 110A,B,C,D may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 11, the BT baseband circuitry 1108*b* may be compliant with a Bluetooth (BT) connectivity standard such as Bluetooth, Bluetooth 14.0 or Bluetooth 12.0, or any other iteration of the Bluetooth Standard. In embodiments that include BT functionality as shown for example in FIG. 11, the radio architecture 110A,B,C,D may be configured to establish a BT synchronous connection oriented (SCO) link and or a BT low energy (BT LE) link. In some of the embodiments that include functionality, the radio architecture 110A,B,C,D may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 11, the functions of a BT radio card and WLAN radio card may be combined on a single wireless radio card, such as single wireless radio card 1102, although embodiments are not so limited, and include within their scope discrete WLAN and BT radio cards In some embodiments, the radio-architecture 110A,B,C,D may include other radio cards, such as a cellular radio card configured for cellular (e.g., 3GPP such as LTE, LTE-Advanced or 5G communications).

In some IEEE 802.11 embodiments, the radio architecture 110A,B,C,D may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 12:
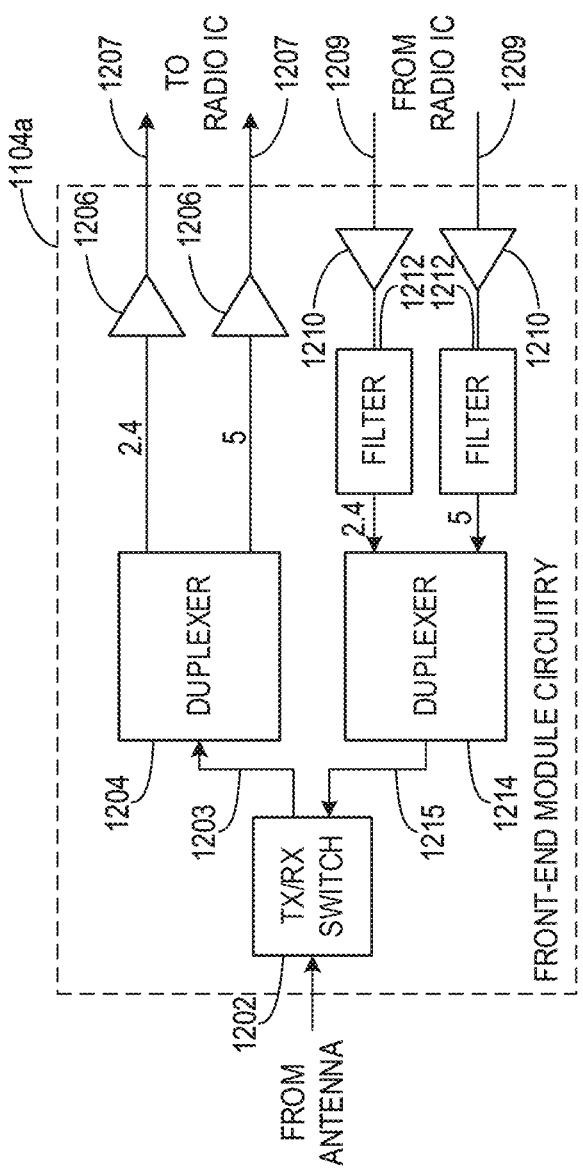
FIG. 12 illustrates an example front-end module circuitry for use in the radio architecture of FIG. 11 in accordance with some examples.

FIG. 12 illustrates WLAN FEM circuitry 1104*a* in accordance with some embodiments. Although the example of FIG. 12 is described in conjunction with the WLAN FEM circuitry 1104*a*, the example of FIG. 12 may be described in conjunction with the example BT FEM circuitry 1104*b* (FIG. 11), although other circuitry configurations may also be suitable.

In some embodiments, the FEM circuitry 1104a may include a TX/RX switch 1202 to switch between transmit mode and receive mode operation. The FEM circuitry 1104a may include a receive signal path and a transmit signal path. The receive signal path of the FEM circuitry 1104a may include a low-noise amplifier (LNA) 1206 to amplify received RF signals 1203 and provide the amplified received RF signals 1207 as an output (e.g., to the radio IC circuitry 1106a-b (FIG. 11)). The transmit signal path of the circuitry 1104a may include a power amplifier (PA) to amplify input RF signals 1209 (e.g., provided by the radio IC circuitry 1106a-b), and one or more filters 1112, such as band-pass filters (BPFs), low-pass filters (LPFs) or other types of filters, to generate RF signals 1115 for subsequent transmission (e.g., by one or more of the antennas 1101 (FIG. 11)) via an example duplexer 1214.

In some dual-mode embodiments for Wi-Fi communication, the FEM circuitry 1104a may be configured to operate in either the 2.4 GHz frequency spectrum or the 12 GHz frequency spectrum. In these embodiments, the receive signal path of the FEM circuitry 1104a may include a receive signal path duplexer 1204 to separate the signals from each spectrum as well as provide a separate LNA 1206 for each spectrum as shown. In these embodiments, the transmit signal path of the FEM circuitry 1104a may also include a power amplifier 1210 and a filter 1212, such as a BPF, an LPF or another type of filter for each frequency spectrum and a transmit signal path duplexer 1204 to provide the signals of one of the different spectrums onto a single transmit path for subsequent transmission by the one or more of the antennas 1101 (FIG. 11). In some embodiments, BT communications may utilize the 2.4 GHz signal paths and may utilize the same FEM circuitry 1104a as the one used for WLAN communications.

Figure 13:
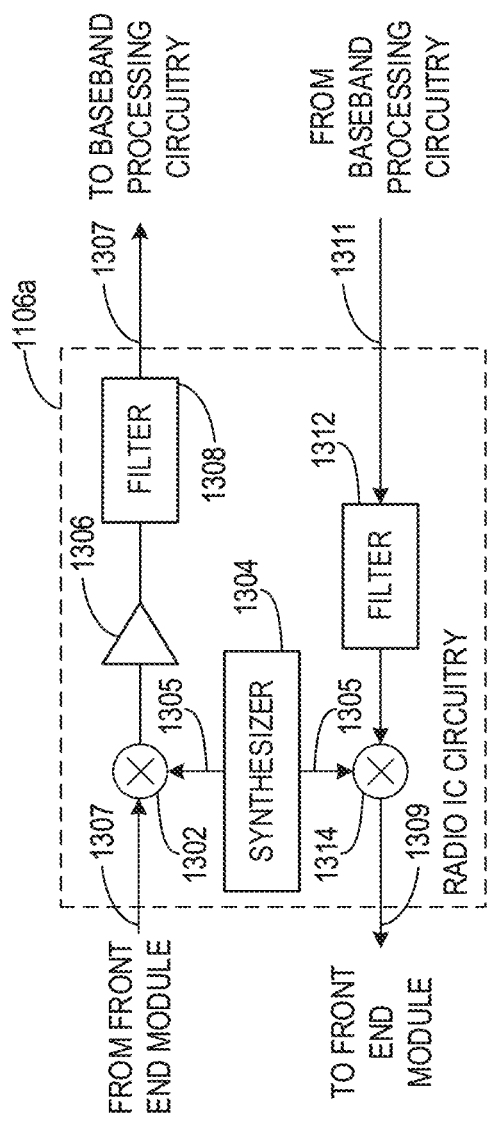
FIG. 13 illustrates an example radio IC circuitry for use in the radio architecture of FIG. 11 in accordance with some examples.

FIG. 13 illustrates radio IC circuitry 1106a in accordance with some embodiments. The radio IC circuitry 1106a is one example of circuitry that may be suitable for use as the WLAN or BT radio IC circuitry 1106a/1106b (FIG. 11), although other circuitry configurations may also be suitable. Alternatively, the example of FIG. 13 may be described in conjunction with the example BT radio IC circuitry 1106b.

In some embodiments, the radio IC circuitry 1106a may include a receive signal path and a transmit signal path. The receive signal path of the radio IC circuitry 1106a may include at least mixer circuitry 1302, such as, for example, down-conversion mixer circuitry, amplifier circuitry 1306 and filter circuitry 1308. The transmit signal path of the radio IC circuitry 1106a may include at least filter circuitry 1312 and mixer circuitry 1314, such as, for example, up-conversion mixer circuitry. Radio IC circuitry 1106a may also include synthesizer circuitry 1304 for synthesizing a frequency 1305 for use by the mixer circuitry 1302 and the mixer circuitry 1314. The mixer circuitry 1302 and/or 1314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 13 illustrates only a simplified version of a radio IC circuitry, and may include, although not shown, embodiments where each of the depicted circuitries may include more than one component. For instance, mixer circuitry 1314 may each include one or more mixers, and filter circuitries 1308 and/or 1312 may each include one or more filters, such as one or more BPFs and/or LPFs according to application needs. For example, when mixer circuitries are of the direct-conversion type, they may each include two or more mixers.

In some embodiments, mixer circuitry 1302 may be configured to down-convert RF signals 1207 received from the FEM circuitry 1104a-b (FIG. 11) based on the synthesized frequency 1305 provided by synthesizer circuitry 1304. The amplifier circuitry 1306 may be configured to amplify the down-converted signals and the filter circuitry 1308 may include an LPF configured to remove unwanted signals from the down-converted signals to generate output baseband signals 1307. Output baseband signals 1307 may be provided to the baseband processing circuitry 1108a-b (FIG. 11) for further processing. In some embodiments, the output baseband signals 1307 may be zero-frequency baseband signals, although this is not a requirement. In some embodiments, mixer circuitry 1302 may comprise passive mixers, although the scope of the embodiments is not limited in this respect.

In some embodiments, the mixer circuitry 1314 may be configured to up-convert input baseband signals 1311 based on the synthesized frequency 1305 provided by the synthesizer circuitry 1304 to generate RF output signals 1209 for the FEM circuitry 1104a-b. The baseband signals 1211 may be provided by the baseband processing circuitry 1108a-b and may be filtered by filter circuitry 1312. The filter circuitry 1312 may include an LPF or a BPF, although the scope of the embodiments is not limited in this respect.

In some embodiments, the mixer circuitry 1302 and the mixer circuitry 1314 may each include two or more mixers and may be arranged for quadrature down-conversion and/or up-conversion respectively with the help of synthesizer 1304. In some embodiments, the mixer circuitry 1302 and the mixer circuitry 1314 may each include two or more mixers each configured for image rejection (e.g., Hartley image rejection). In some embodiments, the mixer circuitry 1302 and the mixer circuitry 1314 may be arranged for direct down-conversion and/or direct up-conversion, respectively. In some embodiments, the mixer circuitry 1302 and the mixer circuitry 1314 may be configured for super-heterodyne operation, although this is not a requirement.

Mixer circuitry 1302 may comprise, according to one embodiment: quadrature passive mixers (e.g., for the in-phase (I) and quadrature phase (Q) paths). In such an embodiment, RF input signal 1207 from FIG. 12 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 1305 of synthesizer 1304 (FIG. 13). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1207 (FIG. 12) may comprise a balanced signal, although the scope of the embodiments is not limited in this respect. The I and Q baseband output signals may be provided to low-noise amplifier, such as amplifier circuitry 1306 (FIG. 13) or to filter circuitry 1308 (FIG. 13).

In some embodiments, the output baseband signals 1307 and the input baseband signals 1311 may be analog baseband signals, although the scope of the embodiments is not limited in this respect. In some alternate embodiments, the output baseband signals 1307 and the input baseband signals 1311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1304 may be a fractional-N synthesizer or a fractional N/N+1 synthesizer, although the scope of the embodiments is not limited in this respect as other types of frequency synthesizers may be suitable. For example, synthesizer circuitry 1304 may be a delta-sigma synthesizer, a frequency multiplier, or a synthesizer comprising a phase-locked loop with a frequency divider. According to some embodiments, the synthesizer circuitry 1304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1304 may be provided by a voltage controlled oscillator (VCO), although that is not a requirement. A divider control input may further be provided by either the baseband processing circuitry 1108*a-b* (FIG. 11) depending on the desired output frequency 1305. In some embodiments, a divider control input (e.g., N) may be determined from a look-up table (e.g., within a Wi-Fi card) based on a channel number and a channel center frequency as determined or indicated by the example application processor 1110. The application processor 1110 may include, or otherwise be connected to, one of the example STA based target wake time controller 112 and/or the example AP based target wake time controller 114 (e.g., depending on which device the example radio architecture is implemented in).

In some embodiments, synthesizer circuitry 1304 may be configured to generate a carrier frequency as the output frequency 1305, while in other embodiments, the output frequency 1305 may be a fraction of the carrier frequency (e.g., one-half the carrier frequency, one-third the carrier frequency). In some embodiments, the output frequency 1305 may be a LO frequency (fLO).

Figure 14:
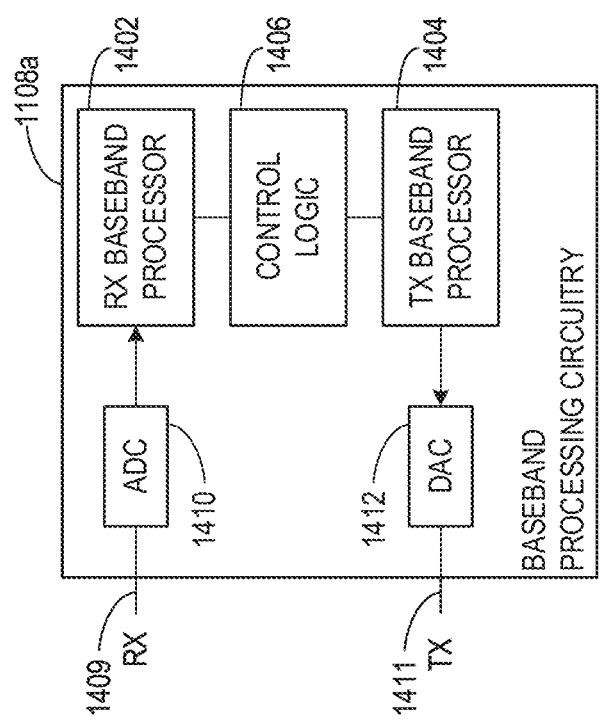
FIG. 14 illustrates an example baseband processing circuitry for use in the radio architecture of FIG. 11 in accordance with some examples.

FIG. 14 illustrates a functional block diagram of baseband processing circuitry 1108*a* in accordance with some embodiments. The baseband processing circuitry 1108*a* is one example of circuitry that may be suitable for use as the baseband processing circuitry 1108*a* (FIG. 11), although other circuitry configurations may also be suitable. Alternatively, the example of FIG. 14 may be used to implement the example BT baseband processing circuitry 1108*b* of FIG. 11.

The baseband processing circuitry 1108*a* may include a receive baseband processor (RX BBP) 1402 for processing receive baseband signals 1309 provided by the radio IC circuitry 1106*a-b* (FIG. 11) and a transmit baseband processor (TX BBP) 1404 for generating transmit baseband signals 1211 for the radio IC circuitry 1106*a-b*. The baseband processing circuitry 1108*a* may also include control logic 1406 for coordinating the operations of the baseband processing circuitry 1108*a*.

In some embodiments (e.g., when analog baseband signals are exchanged between the baseband processing circuitry 1108*a-b* and the radio IC circuitry 1106*a-b*), the baseband processing circuitry 1108*a* may include ADC 1410 to convert analog baseband signals 1409 received from the radio IC circuitry 1106*a-b* to digital baseband signals for processing by the RX BBP 1402. In these embodiments, the baseband processing circuitry 1108*a* may also include DAC 1412 to convert digital baseband signals from the TX BBP 1404 to analog baseband signals 1411.

In some embodiments that communicate OFDM signals or OFDMA signals, such as through baseband processor 1108*a*, the transmit baseband processor 1404 may be configured to generate OFDM or OFDMA signals as appropriate for transmission by performing an inverse fast Fourier transform (IFFT). The receive baseband processor 1402 may be configured to process received OFDM signals or OFDMA signals by performing an FFT. In some embodiments, the receive baseband processor 1402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 11, in some embodiments, the antennas 1101 (FIG. 11) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1101 may each include a set of phased-array antennas, although embodiments are not so limited.

Although the radio-architecture 110A,B,C,D is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 15:
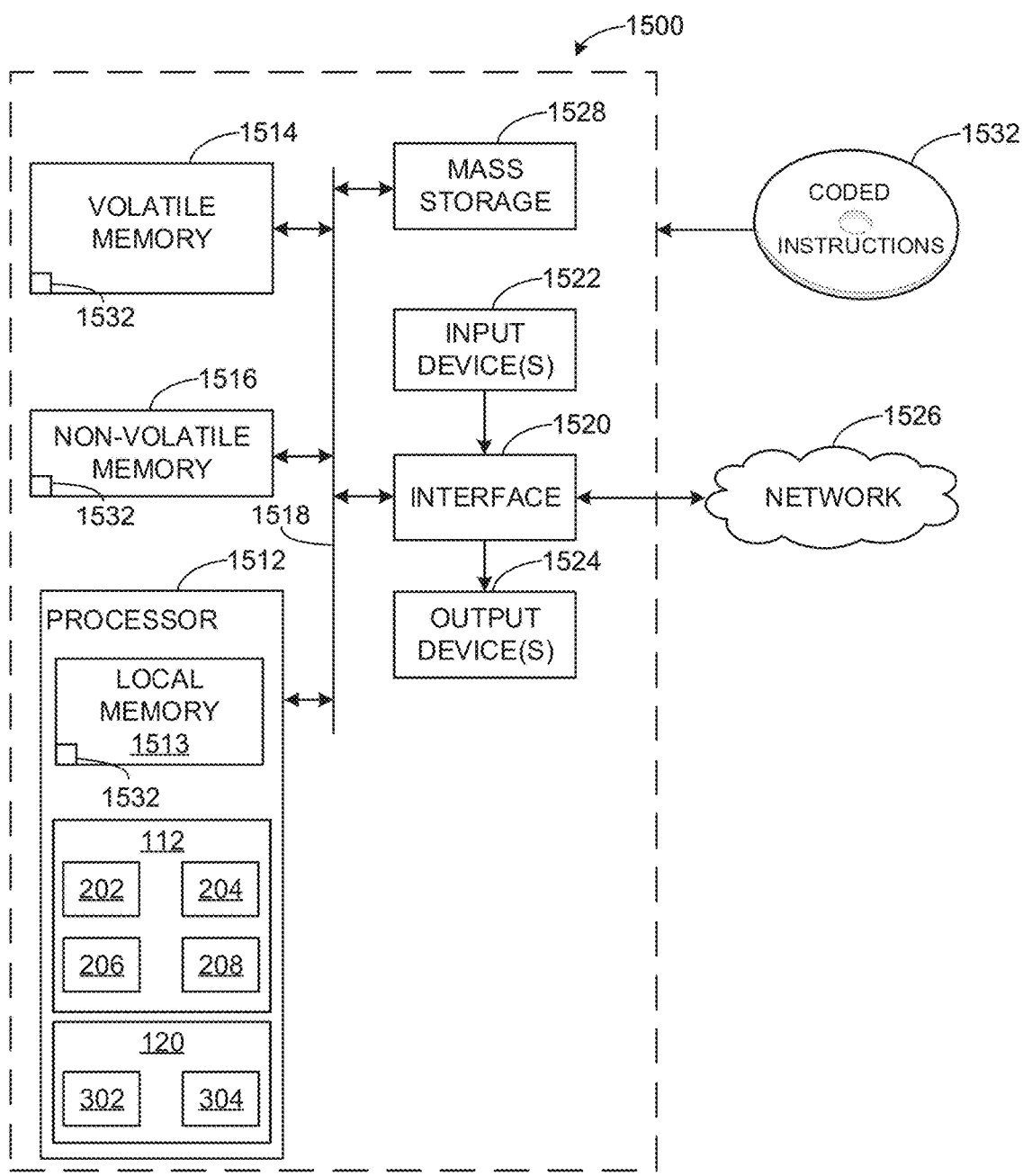
FIG. 15 is a block diagram of a processor platform structured to execute the example machine readable instructions of FIGS. 4-10 to implement the any one of, or any combination of, the station(s) and/or the access point of FIG. 1.

FIG. 15 is a block diagram of an example processor platform 1500 structured to execute the instructions of FIGS. 4-10 to implement the example AP 102 and/or one of the example STAs 104, 106, 108 of FIG. 1. The processor platform 1500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example STA based target wake time controller 112, the example component interface 202, the example data manager 204, the example connection manager 206, and the example TWT negotiator 208 and/or the example AP based target wake time controller 114, the example component interface 302, and the example TWT negotiator 304 (e.g., the processor 1512 only implementing one of the above sets based upon the location of the processor 1512).

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives.

The machine executable instructions 1532 of FIGS. 4-10 may be stored in the mass storage device 1528, in the volatile memory 1514, in the non-volatile memory 1516, and/or on a removable non-transitory computer readable storage medium such as a CD or DVD.

From the foregoing, it will be appreciated that example methods, apparatus and articles of manufacture have been disclosed that facilitate modification of a target wake time (TWT) service period (SP) that was previously agreed upon between an access point (AP) and one or more stations (STAs). In some examples, the modification to the TWT SP can result in the STA operating in a doze (e.g., sleep, low power, etc.) mode for a greater period of time, thereby decreasing power consumption of the STA. In other examples, the modification to the TWT SP can result in greater control of the SP by the STA, ensuring that any queued data in an uplink (UL) buffer of the STA is properly transmitted to the AP during a TWT SP between the AP and the STA.

Example 1 includes a station based apparatus to facilitate target wake time operations between an access point and the station, the apparatus comprising a data manager to determine at least one of a quantity of uplink data to be sent by the station or a quantity of downlink data to be received by the station, a connection manager to schedule a connection of the station to a device different than the access point, and a target wake time negotiator in communication with a component interface to at least one of receive a signal from or distribute a signal to the access point, the signal to modify a service period of the target wake time based on at least one of the quantity of uplink data, the quantity of downlink data, or the scheduled connection.

Example 2 includes the station based apparatus of example 1, wherein the target wake time negotiator is further to distribute a signal to the access point via the component interface requesting an extension of the service period of the target wake time via an end of service period bit when the data manager indicates a non-zero quantity of uplink data to be sent by the station and the target wake time is trigger based.

Example 3 includes the station based apparatus of example 2, wherein the target wake time negotiator is further to distribute the signal to the access point via the component interface requesting the extension of the service period of the target wake time via a quality of service null frame included in a power save poll when the data manager indicates the non-zero quantity of uplink data to be sent by the station and the target wake time is not trigger based.

Example 4 includes the station based apparatus of example 1, wherein the target wake time negotiator is further to distribute a signal to the access point via the component interface requesting early termination of the service period of the target wake time, the early termination to decrease power consumption of the station.

Example 5 includes the station based apparatus of example 1, wherein the target wake time negotiator is further to distribute a signal to the access point via the component interface indicating the service period of the target wake time cannot be exceeded when the connection manager indicates the station is scheduled to connect with the device different from the access point, and the service period of the target wake can be exceeded when the connection manager indicates the station has no other scheduled connections.

Example 6 includes the station based apparatus of example 1, wherein the target wake time negotiator is further to set a multi user bit high, the multi user bit to disable trigger based communication between the station and the access point.

Example 7 includes the station based apparatus of example 6, wherein the target wake time negotiator, in response to the disabling of trigger based communication, is further to at least one of modify a target wake time agreement between the station and the access point, the modified agreement including an indication of non-trigger based communication between the station and the access point, suspend the target wake time agreement between the station and the access point, the suspended agreement to be reinstated when the target wake time negotiator re-enables trigger based communication, or terminate the target wake time agreement between the station and the access point, the terminated agreement to be replaced by an updated agreement including at least one of trigger based or non-trigger based operation.

Example 8 includes an access point based apparatus to facilitate target wake time operations between the access point and a station, the apparatus comprising a component interface to retrieve a message from the station, the message indicating a modification to a service period of the target wake time based on at least one of a quantity of uplink data queued at the station or a scheduled connection of the station, and a target wake time negotiator in communication with a component interface to at least one of accept or reject the modification to the target wake time service period based on a quantity of downlink data queued at the access point.

Example 9 includes the access point based apparatus of example 8, wherein the target wake time negotiator is further to terminate the service period of the target wake time when the message includes at least one of an end of service period bit or an indication of no queued uplink data from the station.

Example 10 includes the access point based apparatus of example 8, wherein the target wake time negotiator is further to maintain the service period of the target wake time when the message includes an indication of a non-zero quantity of queued uplink data from the station.

Example 11 includes the access point based apparatus of example 8, wherein the target wake time negotiator is further to terminate the service period of the target wake time when the message includes a termination request and the access point has no queued downlink data to send to the station.

Example 12 includes the access point based apparatus of example 11, wherein the target wake time negotiator is further to reject the termination request and maintain the service period of the target wake time when the access point has queued downlink data to send to the station.

Example 13 includes the access point based apparatus of example 8, wherein the target wake time negotiator is further to extend the service period of the target wake time when the message includes an indication that the service period of the target wake time can be exceeded and the access point has queued downlink data to send to the station.

Example 14 includes the access point based apparatus of example 8, wherein the target wake time negotiator is further to receive a multi user bit set high from the station, the multi user bit to disable trigger based communication between the station and the access point.

Example 15 includes the access point based apparatus of example 14, wherein the target wake time negotiator, in response to the disabling of trigger based communication, is further to at least one of modify a target wake time agreement between the station and the access point, the modified agreement including an indication of non-trigger based communication between the station and the access point, suspend the target wake time agreement between the station and the access point, the suspended agreement to be reinstated when the target wake time negotiator re-enables trigger based communication, or terminate the target wake time agreement between the station and the access point, the terminated agreement to be replaced by an updated agreement including at least one of trigger based or non-trigger based operation.

Example 16 includes a method to facilitate target wake time operations between an access point and a station, the method comprising determining at least one of a quantity of uplink data to be sent by the station or a quantity of downlink data to be received by the station, scheduling a connection of the station to a device different than the access point, and facilitating signal based communication between the station and the access point, the signal to modify a service period of the target wake time based on at least one of the quantity of uplink data, the quantity of downlink data, or the scheduled connection.

Example 17 includes the method of example 16, further including distributing a signal to the access point requesting an extension of the service period of the target wake time via an end of service period bit in response to an indication of a non-zero quantity of uplink data to be sent by the station.

Example 18 includes the method of example 16, further including distributing a signal to the access point requesting early termination of the service period of the target wake time, the early termination to decrease power consumption of the station.

Example 19 includes the method of example 16, further including distributing a signal to the access point indicating the service period of the target wake time cannot be exceeded in response to an indication that the station is scheduled to connect with the device different from the access point, and the service period of the target wake can be exceeded in response to an indication that the station has no other scheduled connections.

Example 20 includes the method of example 16, further including, in response to a disabling of trigger based communication between the station and the access point, at least one of modifying a target wake time agreement between the station and the access point, the modified agreement including an indication of non-trigger based communication between the station and the access point, suspending the target wake time agreement between the station and the access point, the suspended agreement to be reinstated when the target wake time negotiator re-enables trigger based communication, or terminating the target wake time agreement between the station and the access point, the terminated agreement to be replaced by an updated agreement including at least one of trigger based or non-trigger based operation.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to facilitate a target wake time (TWT) operation between an access point and a station, the apparatus comprising:
a connection manager to schedule a connection between the station and a device different than the access point; and
a target wake time negotiator in communication with a component interface, the target wake time negotiator to:
in response to the connection being scheduled, transmit a first signal to the access point to initialize a first mode of operation including first instructions to disallow extension of TWT service periods (SPs);
initiate a first TWT SP between the station and the access point; and
after performance of the connection between the station and the device different than the access point, transmit a second signal to the access point to initialize a second mode of operation including second instructions to allow extension of a second TWT SP between the station and the access point.

2. The apparatus of claim 1, wherein the target wake time negotiator is to, before the performance of the connection between the station and the device different than the access point, reject a request from the access point to extend a third TWT SP between the station and the access point.

3. The apparatus of claim 1, wherein the target wake time negotiator is to:
transmit a request to the access point to extend the first TWT SP; and
in response to agreement from the access point, transmit a third signal to the access point indicative of a duration by which to extend the first TWT SP between the station and the access point.

4. The apparatus of claim 3, wherein the third signal includes a TWT extension frame specifying the duration by which to extend the first TWT SP.

5. The apparatus of claim 3, wherein the third signal includes a TWT information frame that has been repurposed to store the duration by which to extend the first TWT SP.

6. The apparatus of claim 1, wherein the target wake time negotiator is to query the connection manager to determine the connection scheduled between the station and the device other than the access point.

7. The apparatus of claim 1, wherein the station is a first station, the access point is a first access point, the device other than the first access point includes at least one of a second station or a second access point, and the connection manager to schedule the connection between the first station and at least one of the second station or the second access point.

8. An apparatus to facilitate target wake time (TWT) operation between an access point and a station, the apparatus comprising:
memory;
first instructions; and
processor circuitry to execute the first instructions to cause the processor circuitry to:
schedule a connection between the station and a device different than the access point;
in response to the connection being scheduled, transmit a first signal to the access point to initialize a first mode of operation including second instructions to disallow extension of TWT service periods (SPs);
initiate a first TWT SP between the station and the access point; and
after performance of the connection between the station and the device different than the access point, transmit a second signal to the access point to initialize a second mode of operation including third instructions to allow extension of a second TWT SP between the station and the access point.

9. The apparatus of claim 8, wherein the processor circuitry is to, before the performance of the connection between the station and the device different than the access point, reject a request from the access point to extend a third TWT SP between the station and the access point.

10. The apparatus of claim 8, wherein the processor circuitry is to:
transmit a request to the access point to extend the first TWT SP; and
in response to agreement from the access point, transmit a third signal to the access point indicative of a duration by which to extend the first TWT SP between the station and the access point.

11. The apparatus of claim 10, wherein the third signal includes a TWT extension frame specifying the duration by which to extend the first TWT SP.

12. The apparatus of claim 10, wherein the third signal includes a TWT information frame that has been repurposed to store the duration by which to extend the first TWT SP.

13. The apparatus of claim 8, wherein the processor circuitry is to query a connection manager to determine the connection scheduled between the station and the device other than the access point.

14. The apparatus of claim 8, wherein the station is a first station, the access point is a first access point, the device other than the first access point includes at least one of a second station or a second access point, and the processor circuitry is to schedule the connection between the first station and at least one of the second station or the second access point.

15. A non-transitory computer readable storage medium comprising first instructions which, when executed, cause processor circuitry to at least:
schedule a connection between a station and a device different than an access point;
in response to the connection being scheduled, transmit a first signal to the access point to initialize a first mode of operation including second instructions to disallow extension of target wake time (TWT) service periods (SPs);
initiate a first TWT SP between the station and the access point; and
after performance of the connection between the station and the device different than the access point, transmit a second signal to the access point to initialize a second mode of operation including third instructions to allow extension of a second TWT SP between the station and the access point.

16. The non-transitory computer readable medium of claim 15, wherein the first instructions, when executed, cause the processor circuitry to, before the performance of the connection between the station and the device different than the access point, reject a request from the access point to extend a third TWT SP between the station and the access point.

17. The non-transitory computer readable medium of claim 15, wherein the first instructions, when executed, cause the processor circuitry to:
   transmit a request to the access point to extend the first TWT SP; and
   in response to agreement from the access point, transmit a third signal to the access point indicative of a duration by which to extend the first TWT SP between the station and the access point.

18. The non-transitory computer readable medium of claim 17, wherein the third signal includes a TWT extension frame specifying the duration by which to extend the first TWT SP.

19. The non-transitory computer readable medium of claim 17, wherein the third signal includes a TWT information frame that has been repurposed to store the duration by which to extend the first TWT SP.

20. The non-transitory computer readable medium of claim 15, wherein the first instructions, when executed, cause the processor circuitry to query a connection manager to determine the connection scheduled between the station and the device other than the access point.

* * * * *